US008654368B2

(12) United States Patent
Kuroshima

(10) Patent No.: US 8,654,368 B2
(45) Date of Patent: Feb. 18, 2014

(54) FILE CONTROL APPARATUS, PRINT SYSTEM, AND PROGRAM FOR CONTROLLING THEM

(75) Inventor: Masashi Kuroshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 13/055,921

(22) PCT Filed: Oct. 9, 2009

(86) PCT No.: PCT/JP2009/067951
§ 371 (c)(1),
(2), (4) Date: Jan. 25, 2011

(87) PCT Pub. No.: WO2010/044477
PCT Pub. Date: Apr. 22, 2010

(65) Prior Publication Data
US 2011/0128584 A1    Jun. 2, 2011

(30) Foreign Application Priority Data

Oct. 14, 2008 (JP) .................................. 2008-265713

(51) Int. Cl.
*G06K 15/00*    (2006.01)
*G06F 3/12*    (2006.01)
(52) U.S. Cl.
USPC ............................. 358/1.14; 358/1.15; 707/1
(58) Field of Classification Search
USPC ....................................................... 358/1.15
See application file for complete search history.

(56) References Cited

U.S. PATENT DOCUMENTS

| 7,580,943 | B2 | 8/2009 | Sakura et al. | |
|---|---|---|---|---|
| 2003/0016374 | A1* | 1/2003 | Christodoulou et al. | 358/1.12 |
| 2006/0287974 | A1* | 12/2006 | Mochizuki et al. | 707/1 |
| 2007/0005561 | A1* | 1/2007 | Sakura et al. | 707/1 |
| 2007/0024895 | A1* | 2/2007 | Clark | 358/1.15 |
| 2008/0137134 | A1* | 6/2008 | Igarashi | 358/1.15 |
| 2010/0225963 | A1 | 9/2010 | Kuroshima | |

FOREIGN PATENT DOCUMENTS

| JP | 11-65784 A | 3/1999 |
|---|---|---|
| JP | 2006-209508 A | 8/2006 |
| JP | 2006-268110 A | 10/2006 |
| JP | 2006-350945 A | 12/2006 |

(Continued)

OTHER PUBLICATIONS

PCT International Search Report and Written Opinion of the International Searching Authority, mailed Dec. 1, 2010 in PCT/JP2009/067951.

(Continued)

*Primary Examiner* — Huo Long Chen
(74) *Attorney, Agent, or Firm* — Fitzpatrick, Cella, Harper & Scinto

(57) ABSTRACT

Print setting information including information indicating an order of entries of files is created, and a print job is created by appending the print setting information. A sequence of created print jobs to be transmitted is arranged based on the information which is included in the print setting information and indicates the order of entries of files, and process restriction information associated with the print job is acquired from a print device. When it is determined that restriction by the process restriction information is exceeded upon continuously receiving a plurality of print jobs, a succeeding print job is changed so that the process restriction information is not exceeded even when the succeeding print job is transmitted.

12 Claims, 39 Drawing Sheets

(56) References Cited

FOREIGN PATENT DOCUMENTS

| JP | 2007011576 A | 1/2007 |
| JP | 2007-156532 A | 6/2007 |
| JP | 2007-241690 A | 9/2007 |

OTHER PUBLICATIONS

Japanese Office Action dated Nov. 30, 2012 issued in corresponding Japanese Patent Application No. 2008-265713.

* cited by examiner

F I G. 7C
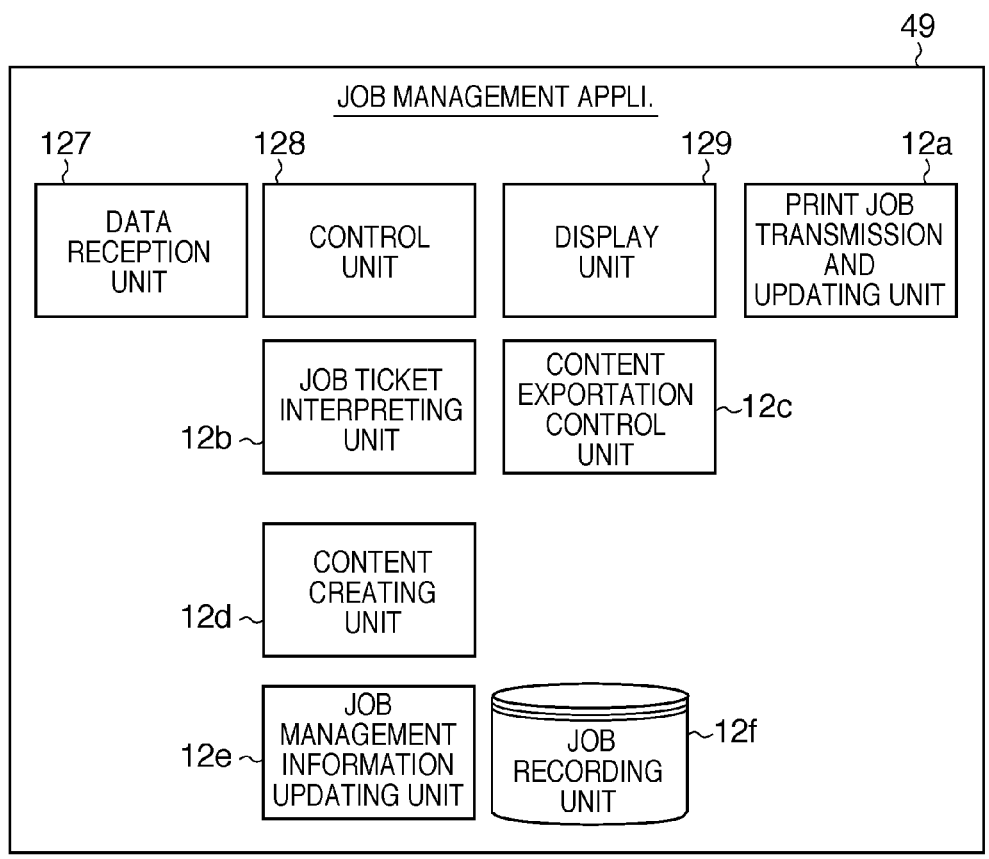

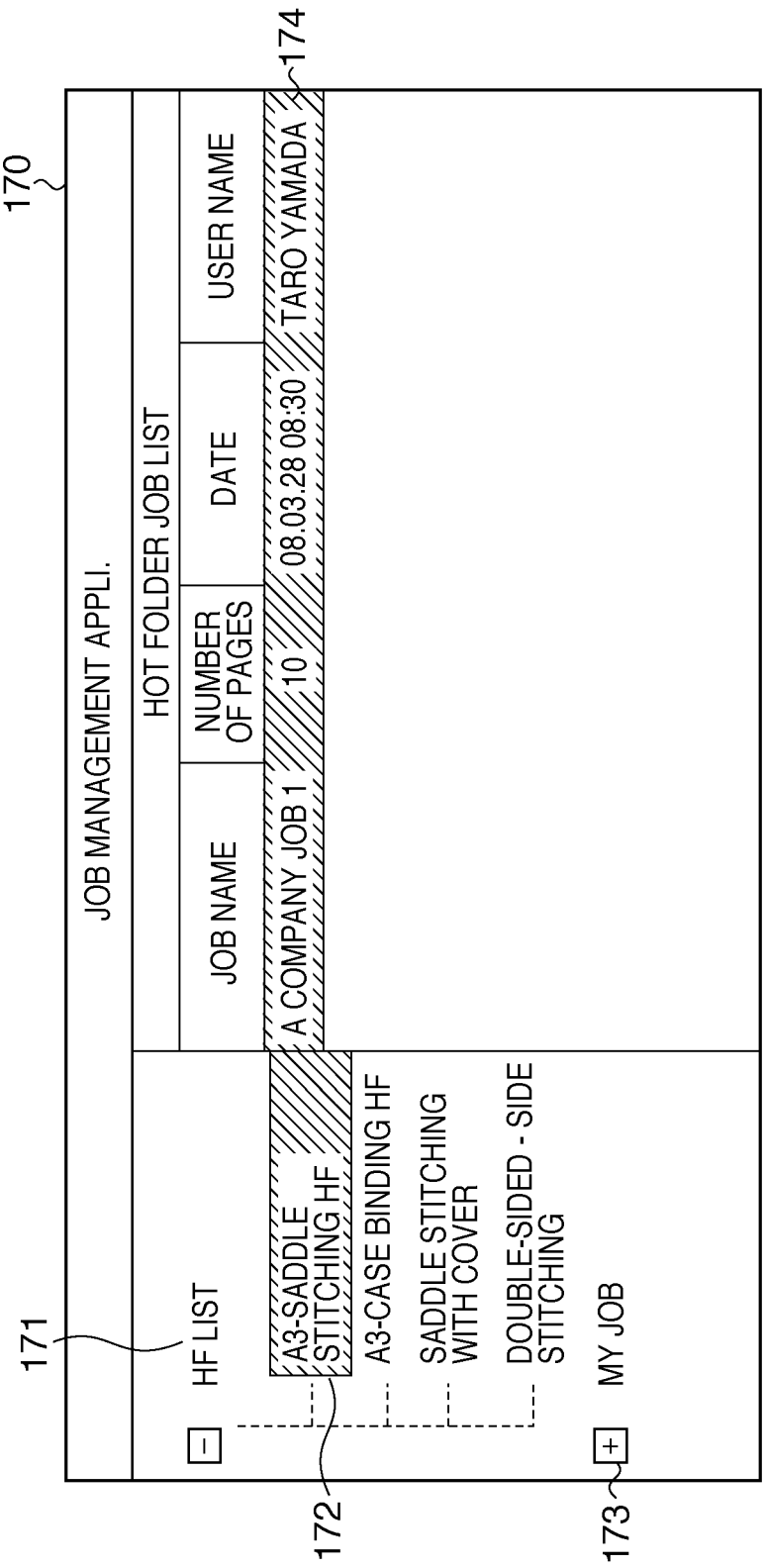

FIG. 14B

JOB MANAGEMENT APPLI.

HF LIST — 171

- A3-SADDLE STITCHING HF — 172
- A3-CASE BINDING HF
- SADDLE STITCHING WITH COVER
- DOUBLE-SIDED - SIDE STITCHING

MY JOB — 173

HOT FOLDER JOB LIST — 170

| JOB NAME | NUMBER OF PAGES | DATE | USER NAME |
|---|---|---|---|
| A COMPANY JOB 1 | 10 | 08.03.28 08:30 | TARO YAMADA — 174 |
| A COMPANY JOB 3 | 10 | 08.03.28 08:35 | ICHIRO SUZUKI — 180 |

F I G. 14C

| JOB MANAGEMENT APPLI. | | | | |
|---|---|---|---|---|
| | HOT FOLDER JOB LIST | | | |
| HF LIST | JOB NAME | NUMBER OF PAGES | DATE | USER NAME |
| A3-SADDLE STITCHING HF | A COMPANY JOB 1 | 10 | 08.03.28 08:30 | TARO YAMADA |
| A3-CASE BINDING HF | A COMPANY JOB 3 | 10 | 08.03.28 08:35 | ICHIRO SUZUKI |
| SADDLE STITCHING WITH COVER | A COMPANY JOB 2 | 10 | 08.03.28 08:32 | YOHEI KONO |
| DOUBLE-SIDED - SIDE STITCHING | A COMPANY JOB 4 | 10 | 08.03.28 08:38 | EISAKU SATO |
| MY JOB | | | | |

FIG. 19C (4) DISPLAY UPPER LIMIT VALUES THAT ALLOW TO EXECUTE
PRINTING WITH RESPECT TO DEVICE 1 AFTER HOT FOLDER-1

240

| HOT FOLDER SETTING | |
|---|---|
| [COMMON]<br>PRINT DESTINATION: DEVICE 1<br><br>[PRINT]<br>NUMBER OF COPIES: 1<br>MEDIA: NOT DESIGNATED<br>PRINT METHOD: NOT DESIGNATED<br><br>[EXCEPTION SETTING]<br>SET EXCEPTION PAGE...<br>SET INSERTION SHEET... | [BOOKBINDING]<br>○ SADDLE STITCHING<br>OPEN DIRECTION: LEFT-OPEN<br>FINISHER: FOLDING AND STAPLE<br>○ STAPLE<br>STAPLE POSITION: UPPER LEFT<br>◉ CASE BINDING<br>COVER: CASSETTE UPPER<br>BODY OF BOOK: PAPER DECK |

[ SET ]  [ CANCEL ]

254

UPPER LIMIT VALUE OF HOT FOLDER SETTING

[PRINT DESTINATION : DEVICE 1]

- PARTITION        : 600
- INSERTION SHEET  : 900

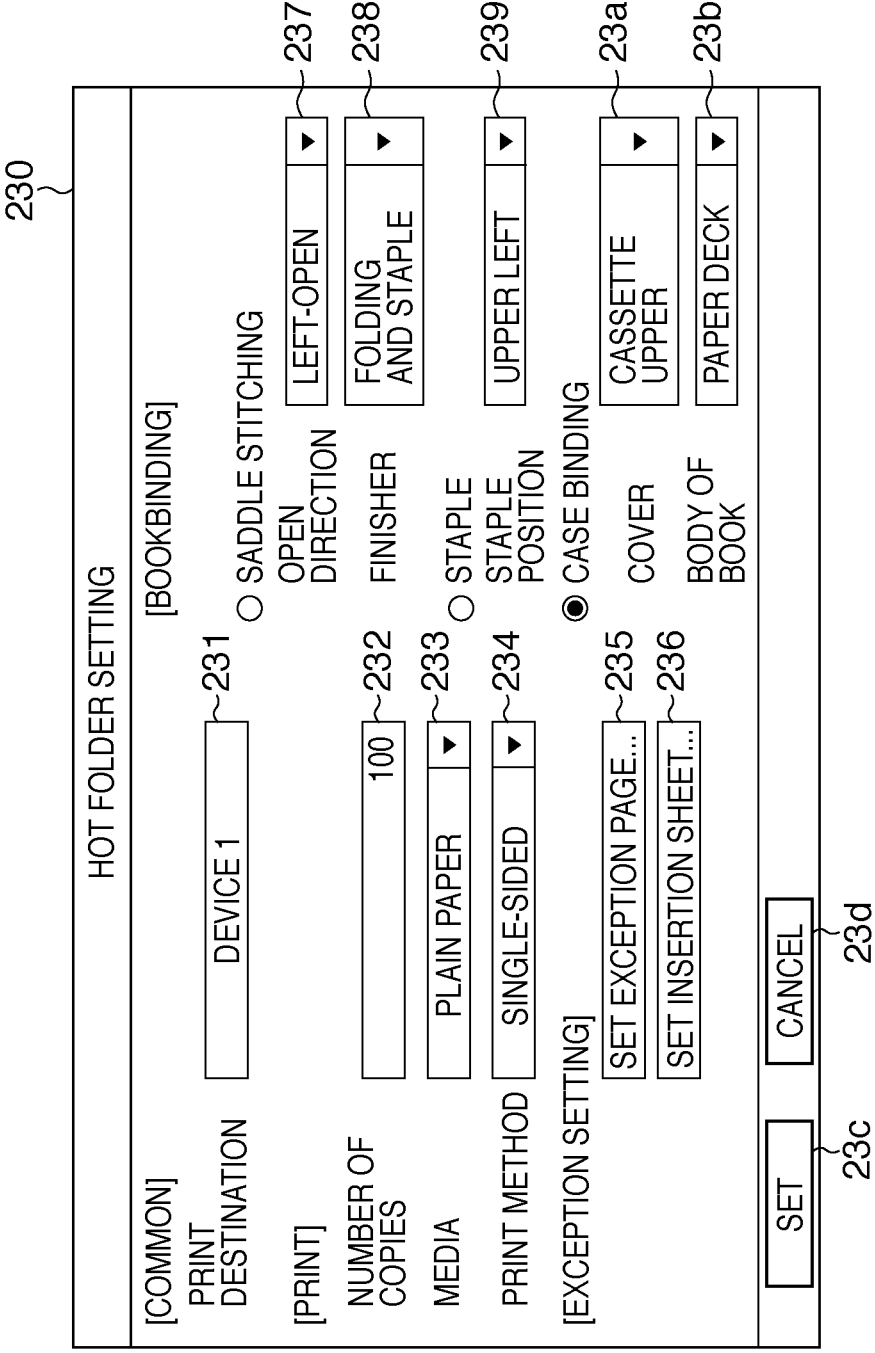

FIG. 21

HOT FOLDER SETTING — 240

[COMMON]
PRINT DESTINATION: DEVICE 1

[PRINT]
NUMBER OF COPIES: 1
MEDIA: NOT DESIGNATED
PRINT METHOD: NOT DESIGNATED

[EXCEPTION SETTING]
SET EXCEPTION PAGE...
SET INSERTION SHEET...

[BOOKBINDING]
○ SADDLE STITCHING
OPEN DIRECTION: LEFT-OPEN
FINISHER: FOLDING AND STAPLE
○ STAPLE
STAPLE POSITION: UPPER LEFT
● CASE BINDING
COVER: CASSETTE UPPER
BODY OF BOOK: PAPER DECK

[ SET ]  [ CANCEL ]

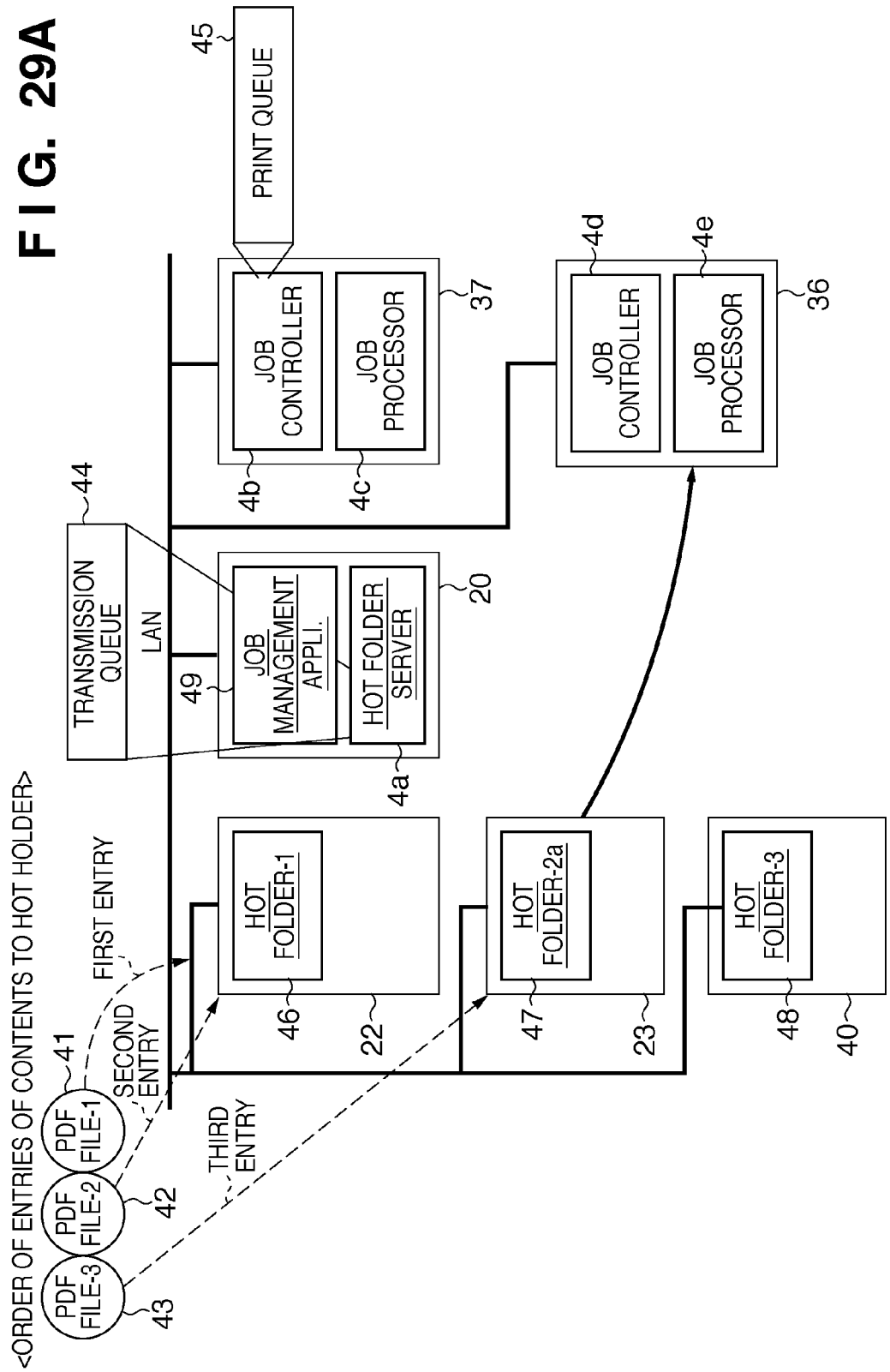

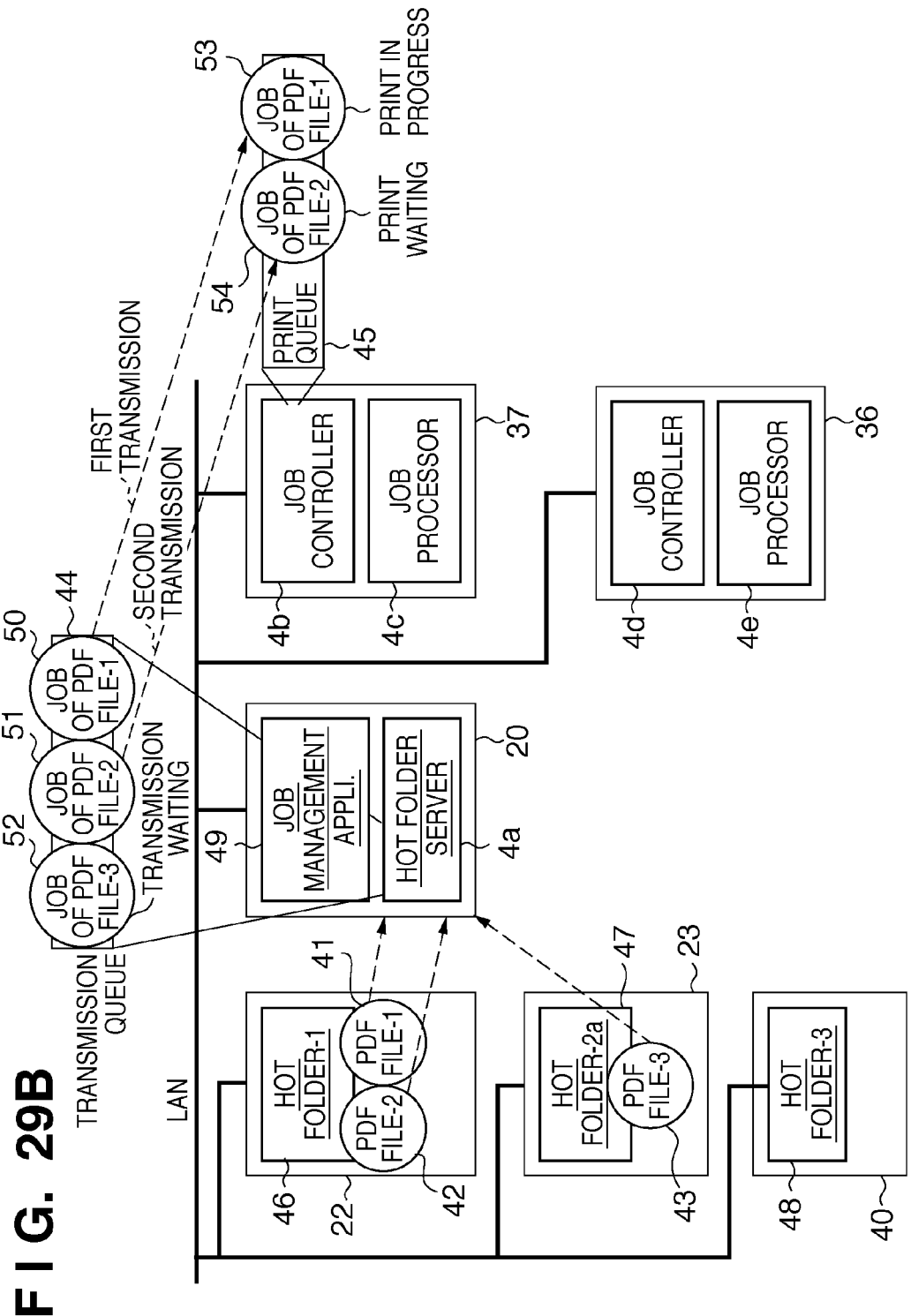

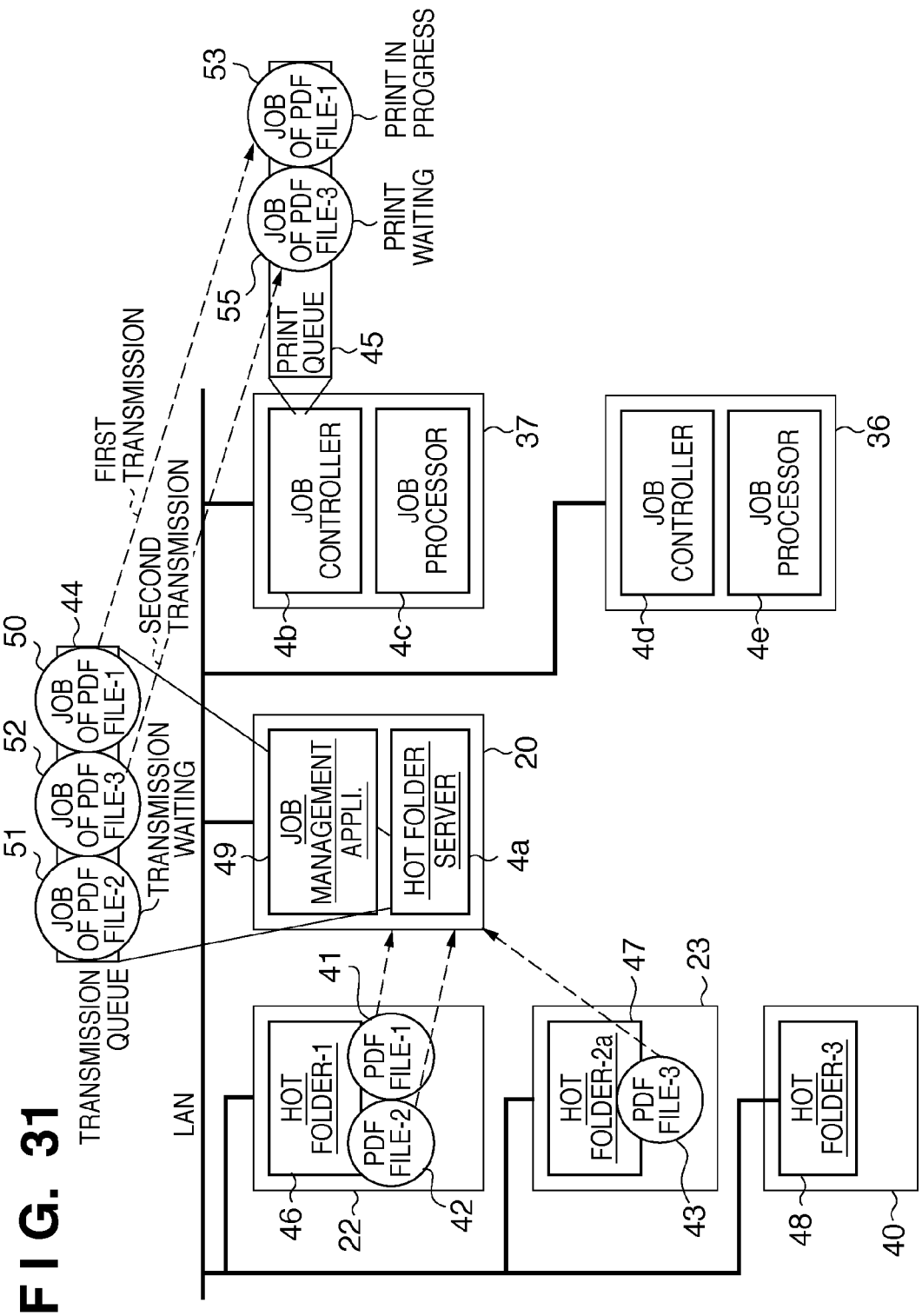

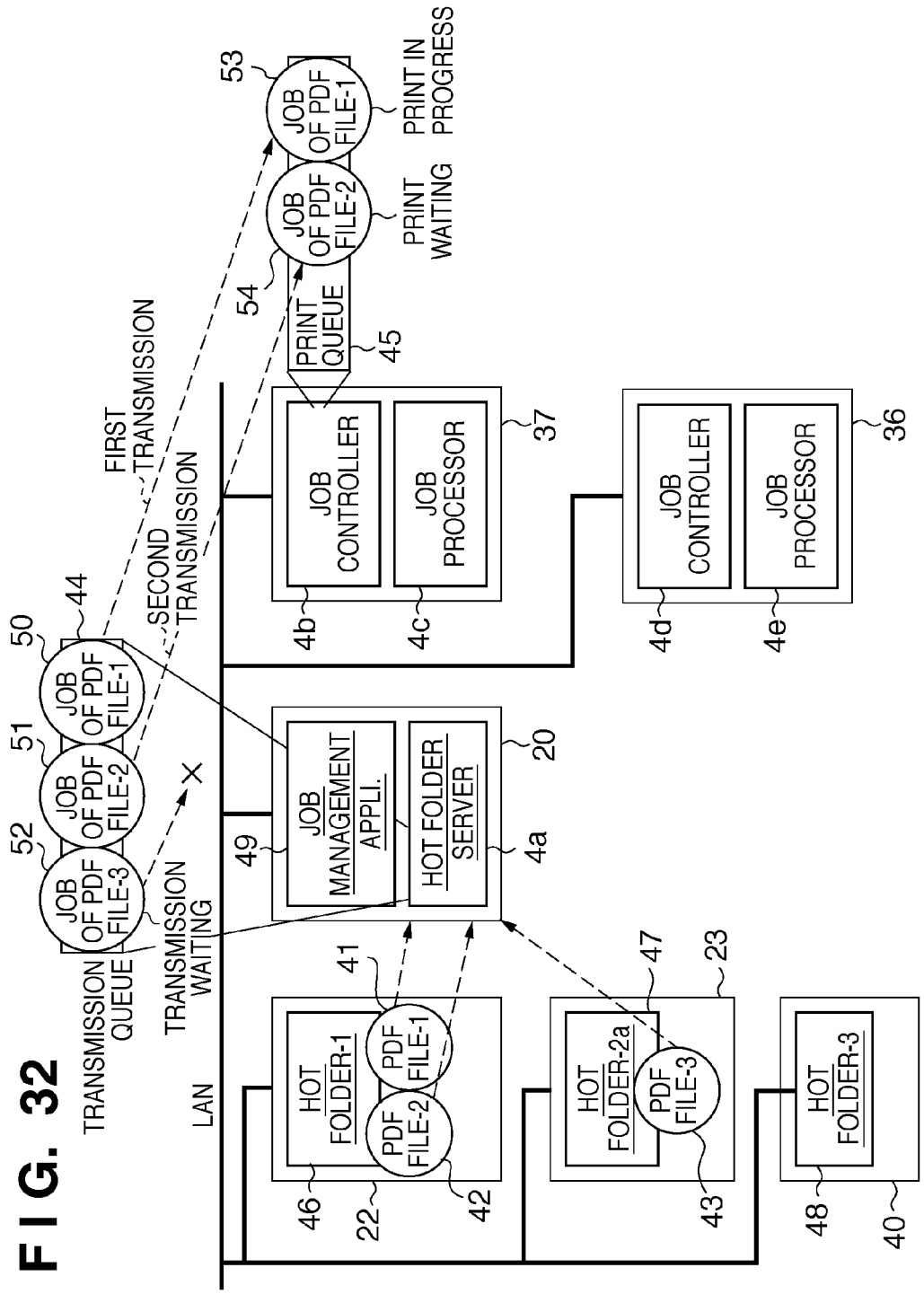

FILE CONTROL APPARATUS, PRINT SYSTEM, AND PROGRAM FOR CONTROLLING THEM

TECHNICAL FIELD

The present invention relates to a file control apparatus, print system, and program for controlling them. For example, the present invention relates to print job control and hot folder creation control required to efficiently print a large quantity of files by turns in a print system including a print job creation device, print job management device, and print device, and a program for executing the control.

BACKGROUND ART

As a print system, a so-called in-house print system is known. For example, this in-house print system receives a creation request of printed matters (manuals, reports for customers, etc.) ordered from a client as a given department of A-company, and creates and delivers desired printed matters to the client. As such print system which simply prints a file received from a customer, printing using a so-called hot folder function is executed. For example, print setting information is designated using the hot folder function, and a finishing device included in a known image forming apparatus which forms the print system executes bookbinding processing (staple, punch pressing, saddle stitching, case binding, etc.) of output document sheets.

An example of print job processing in a conventional POD (Print On Demand) system using a hot folder (to be also abbreviated as an HF hereinafter) will be described below (Japanese Patent Laid-Open No. 2007-11576).

FIGS. 29A and 29B show examples in which files are printed in the order of entries into an HF. FIG. 30 shows an example from when a file is entered into an HF client application (to be referred to as an HF client appli. hereinafter) until that file is transmitted as a print job from an HF server application (to be referred to as an HF server appli. hereinafter).

FIG. 29A is a view showing the order of entries of files into an HF using a diagram for explaining the overall arrangement of a conventional POD system.

HF client PCs of this related art include HF client PCs 22, 23, and 40. Reference numerals 46 to 48 denote HF client applis. which run on the HF client PCs 22, 23, and 40. The HF clients 22, 23, and 40 may be configured on a single PC. Reference numerals 41 to 43 denote content data files to be printed, which are sent from a plurality of operators. In this related art, each content data file is a PDF file, and the file 41 is entered into the HF client appli. 46 first. The file 42 is then entered into the HF client appli. 46 second, and the file 43 is entered into the HF client appli. 47 last.

Reference numeral 4a denotes an HF server appli. which runs on an HF server PC 20, and includes a transmission queue 44 used to transfer print data to a print device such as a color MFP 37. Files set in the transmission queue 44 undergo transmission processing to a color MFP 36 and the color MFP 37 in the order they were set. Reference numeral 49 denotes a job management application (to be referred to as a job management appli. hereinafter) which runs on the HF server PC 20, and is used to monitor a print job transmitted from the HF server appli. 4a, and to monitor statuses of print jobs in the color MFP 37.

Reference numeral 4b denotes a job controller which is installed in the color MFP 37, and includes a print queue 45. Jobs set in the print queue 45 undergo print processing of the color MFP 37 in the order they were set. A print job which has undergone RIP processing is set in the print queue 45, and is subject to various restrictions of the color MFP 37. Reference numeral 4c denotes a job processor which is installed in the color MFP 37, and executes print processing of jobs recorded in the print queue 45. A job controller 4d and job processor 4e in the color MFP 36 are the same as the job controller 4b and job processor 4c. Note that in this related art, a print job that has undergone the RIP processing is set in the print queue. In embodiments to be described later, a print job before the RIP processing may be set.

FIG. 29B shows processing as the sequel of FIG. 29A. FIG. 29B is a view for explaining processing until files are printed after the files are entered into the HF. Note that the same reference numerals in FIG. 29B denote the same elements as in FIG. 29A.

After the operations in FIG. 29A, a PDF file-1 and PDF file-2 are copied onto the HF appli. 46. Also, a PDF file-3 is copied onto the HF appli. 47. The HF client applis. 46 and 47 sequentially transfer the copied PDF file-1, PDF file-2, and PDF file-3 to the HF server appli. 4a. On the HF server appli. 4a, a JDF (Job Definition Format) file as a print setting information file is appended to each of these PDF files to convert them into print jobs 50 to 52, which are then set on the transmission queue 44. The print job 50 corresponds to the PDF file-1, the print job 51 corresponds to the PDF file-2, and the print job 52 corresponds to the PDF file-3. The print jobs 50 to 52 are transmitted to devices (color MFPs 36 and 37) described in their JDF files in the order these jobs were set in the transmission queue 44.

In this related art, as shown in FIG. 29B, the print jobs 50 and 51 are transmitted to the color MFP 37, and the print job 50 is set on the print queue 45 and its printing is in progress as a print job 53. Also, as shown in FIG. 29B, the print job 51 is transmitted to the MFP 37 after the print job 50, and is waiting for printing on the print queue 45 as a print job 54. A print instruction of the print job 52 using the color MFP 37 is issued, but the print job 52 is waiting for transfer until the print job 53 is completed due to the restrictions of the color MFP 37. The restrictions of a device (color MFP 36 or 37) include a DISK capacity, a number of exception settings used to make different settings for respective pages, a number of insertion settings used to instruct insertion of sheets, and the like. Details of such restrictions will be described later in the description of the embodiments.

FIG. 30 explains in detail processing of the HF server appli. 4a until transmission from the transmission queue 44 shown in FIGS. 29A and 29B.

Reference numerals P150 to P155 denote processing contents (processes), which are processed in this order of numbers. In P150, the user drags & drops the PDF file-1 41 onto the HF client appli. 46. In this related art, the HF client appli. 46 records a setting that executes saddle stitching using A3 paper sheets. Upon detection of an entry of the PDF file-1 41, the HF client appli. 46 notifies the HF server appli. 4a of a data processing request in P151. The HF server appli. 4a creates a JDF job creation thread 1 158 for data processing. Then, the PDF file-1 41 is transferred from the HF client appli. 46 to the HF server appli. 4a. In P152, the HF server appli. 4a checks if the PDF file-1 41 has a file type that can be processed by the HF server appli. 4a and the color MFP. In P153, the HF server appli. 4a creates a JDF file 150 as a print instruction that records print setting information set in the HF client appli. 46. In P154, the HF server appli. 4a MIME-encodes the PDF file-1 41 and JDF file 150 to create the print job 50. In P155, the HF server appli. 4a transfers the print job 50 created in P155 to the transmission queue 44 on a transmission thread 159 which controls transmission. The print job 50 which is waiting for transfer at that time is illustrated as a job 1 53. Note that reference numerals 156 and 157 denote job creation threads 2 and 3, which are different from the JDF job creation thread 1 158, and correspond to, for example, the PDF file-2 42 and PDF file-3 43.

A technique that allows changing such print attributes set at the time of HF creation upon execution of printing via the HF is also known. For example, in Japanese Patent Laid-Open No. 2007-11576, since the user is allowed to designate whether or not respective items of print attributes set at the time of HF creation are permitted to be changed at the time of execution of printing, a dialog which inquires the user about necessity/unnecessity of changes is presented to the user at the drop timing of a file onto the HF.

However, the aforementioned print technique using the HF suffers the following problems.

FIG. 31 shows an example in which print jobs are set in the print queue 45 of the color MFP 37 in an order different from their order of entries. Note that the same reference numerals in FIG. 31 denote the same elements as in FIGS. 29A and 29B.

The PDF file-1 41, PDF file-2 42, and PDF file-3 43 are entered into the HF client appli. 46 or 47 in the order named as in the example of FIGS. 29A and 29B. However, in FIG. 31, the print jobs 50, 52, and 51 are set in the transmission queue 44 in the order named unlike in the example of FIG. 29B. Since the order set in the transmission queue 44 is different, the order of print jobs set in the print queue 45 of the color MFP 37 is different from the order of entries of the PDF files. That is, a print job 55 corresponding to the PDF file-3 43 is set in the print queue 45 first, and is printed.

Such reversal of the orders occurs for the following reason. For example, as has been described above using FIG. 30, many processes are required from the entries of the PDF files into the HF client applis. 46 and 47 until the corresponding print jobs are set in the transmission queue 44. Therefore, processing times required until the corresponding print jobs are set in the transmission queue 44 have differences depending on the sizes of the entered PDF files, the complexities and sizes of JDF files to be created, and an environment on the HF server PC 20. As a result, the order of print jobs set in the transmission queue 44 and print queue 45 is reversed from the order of entries of the PDF files.

FIG. 32 shows an example in which the print job 52 cannot be transferred due to restrictions of the color MFP 37, and a print waiting job cannot be created in the print queue 45 of the color MFP 37 in this related art. Note that the same reference numerals in FIG. 32 denote the same elements as in FIGS. 29A and 29B.

This related art shows an example in which the next print job 52 cannot be transmitted before completion of the print job 54 whose printing is in progress, and print waiting occurs in the color MFP 37 after completion of the print job 54, resulting in a performance drop.

Furthermore, at the time of simultaneous processing from the plurality of HF client applis., since jobs from different client applis. are mixed, printed matters are required to be sorted for respective client applis. after completion of printing. That is, when print operator A (who has charge of an X company) and print operator B (who has charge of a Y company) simultaneously execute print processing from the two HF client applis., jobs of different customers (print settings) are output together. For this reason, the printed matters are required to be sorted for respective client applis., resulting in a performance drop. Especially, when output printed matters undergo bookbinding processing (staple, punch pressing, saddle stitching, case binding, etc.) using a finishing device, a performance drop is considerable.

As described above, the related art suffers the following problems. Files are often printed not in the order of entries to the HF client applis. Continuous entries of print jobs from another HF client appli. to an identical client appli. and print processing of the print jobs are often disabled due to the restrictions of a print device. Furthermore, at the time of simultaneous processing from a plurality of HF client applis., print jobs of different customers (print settings) are mixed, and printed matters are required to be sorted.

DISCLOSURE OF INVENTION

The present invention has been made in consideration of the aforementioned problems, and provides a file control apparatus and print system, which are controlled to print files in the order of entries to HF client applis., and a program for controlling them.

Also, the present invention provides a file control apparatus and print system, which are controlled to allow continuous entries of print jobs from another HF client appli. to an identical client appli. and print processing of the print jobs even under restrictions of a print device, and a program for controlling them.

Furthermore, the present invention provides a file control apparatus and print system, which are controlled to prevent print jobs of different customers (print settings) from being mixed at the time of simultaneous processing from a plurality of HF client applis., and a program for controlling them.

In order to solve the aforementioned problems, a file control apparatus according to the present invention, comprises: a reception unit configured to receive an entry of a file; a print setting information creating unit configured to create print setting information including information indicating an order of entries of files to the reception unit; a print job creating unit configured to create a print job by appending the print setting information created by the print setting information creating unit to the file received by the reception unit; a transmission unit configured to transmit the print job created by the print job creating unit to a print device; a print job management unit configured to arrange a sequence of print jobs, which are created by the print job creating unit and are to be transmitted from the transmission unit, based on information which is included in the print setting information and indicates the order of entries of files; an acquiring unit configured to acquire process restriction information associated with a print job from the print device; a determination unit configured to determine whether or not restriction by the process restriction information acquired by the acquiring unit is exceeded when the print device continuously receives a plurality of print jobs corresponding to a plurality of files received by the reception unit; and a print job changing unit configured to change, when the determination unit determines that the restriction by the process restriction information is exceeded when the plurality of print jobs are continuously received, a setting of a succeeding print job so as not to exceed the restriction by the process restriction information even when the succeeding print job is transmitted.

A file control apparatus according to the present invention, comprises: a reception unit configured to receive an entry of a file; a print setting information creating unit configured to create print setting information including information indicating an order of entries of files to the reception unit; a print job creating unit configured to create a print job by appending the print setting information created by the print setting information creating unit to the file received by the reception unit;

a transmission unit configured to transmit the print job created by the print job creating unit to a print device; and a print job management unit configured to arrange a sequence of print jobs, which are created by the print job creating unit and are to be transmitted from the transmission unit, based on the information which is included in the print setting information and indicates the order of entries of files.

A print system according to the present invention, comprises a print section including a plurality of print devices, and the file control apparatus as mentioned above, which is connected to the print section via a network and controls print processing of the plurality of print devices.

A print system according to the present invention, comprises a print section including a plurality of print devices, the file control apparatus as mentioned above, which is connected to the print section via a first network and controls print processing of the plurality of print devices, and an operator environment configured to perform an entry of a file to the reception unit of the file control apparatus, the operator environment being connected to the file control apparatus via a second network.

A method of controlling a file control apparatus according to the present invention, comprises the steps of: receiving an entry of a file; creating print setting information including information indicating an order of entries of files in the receiving step; creating a print job by appending the print setting information created in the step of creating the print setting information to the file received in the receiving step; transmitting the print job created in the step of creating the print job to a print device; arranging a sequence of print jobs, which are created in the step of creating the print job and are to be transmitted in the transmitting step, based on the information which is included in the print setting information and indicates the order of entries of files; acquiring process restriction information associated with a print job from the print device; determining whether or not restriction by the process restriction information acquired in the acquiring step is exceeded when the print device continuously receives a plurality of print jobs corresponding to a plurality of files received in the receiving step; and changing, when it is determined in the determining step that the restriction by the process restriction information is exceeded when the plurality of print jobs are continuously received, a succeeding print job so as not to exceed the restriction by the process restriction information even when the succeeding print job is transmitted.

A method of controlling a file control apparatus according to the present invention, comprises the steps of: receiving an entry of a file; creating print setting information including information indicating an order of entries of files in the receiving step; creating a print job by appending the print setting information created in the step of creating the print setting information to the file received in the receiving step; transmitting the print job created in the step of creating the print job to a print device; and arranging a sequence of print jobs, which are created in the step of creating the print job and are to be transmitted in the transmitting step, based on the information which is included in the print setting information and indicates the order of entries of files.

A program according to the present invention, is a program for making a computer execute respective steps of the method of controlling a file control apparatus as mentioned above.

According to the present invention, printing can be executed in the order of entries to the HF client applis.

Also, even under device restrictions, continuous entries of print jobs from another HF client appli. to an identical client appli. and print processing of the print jobs are allowed.

Furthermore, since print jobs of different customers (print settings) are not mixed at the time of simultaneous processing from a plurality of HF client applis., sorting of printed matters is not required.

As a result, a print system with high performance which does not produce any print waiting time can be built.

Further features of the present invention will become apparent from the following description of exemplary embodiments with reference to the attached drawings.

BRIEF DESCRIPTION OF DRAWINGS

FIG. 7C is a block diagram showing an example of the detailed arrangement of a job management appli. according to the first embodiment;

FIG. 14A is a view showing an example in which the order of print jobs is changed on the job management appli. according to the first embodiment;

FIG. 14B is a view showing an example in which the order of print jobs is changed on the job management appli. according to the first embodiment;

FIG. 14C is a view showing an example in which the order of print jobs is changed on the job management appli. according to the first embodiment;

FIGS. 19A to 19C are views for explaining an example of HF print setting processing according to the second embodiment;

FIG. 20 is an enlarged view showing an example of an HF print setting window 230 shown in FIG. 19B;

FIG. 21 is an enlarged view showing an example of an HF print setting window 240 shown in FIG. 19C;

FIG. 29A is a view for explaining an example of content entry processing into an HF of a conventional POD system;

FIG. 29B is a view for explaining an example of print processing of contents entered into the HF of the conventional POD system;

FIG. 31 is a view for explaining a case in which the order of entries of contents into the conventional HF is different from the print order; and FIG. 32 is a view for explaining an example in which a waiting time is produced in a print queue of a conventional device.

BEST MODE FOR CARRYING OUT THE INVENTION

Embodiments according to the present invention will be described in detail hereinafter with reference to the accompanying drawings.

<Arrangement Example of POD (Print on Demand) System of this Embodiment>

Figure 1:
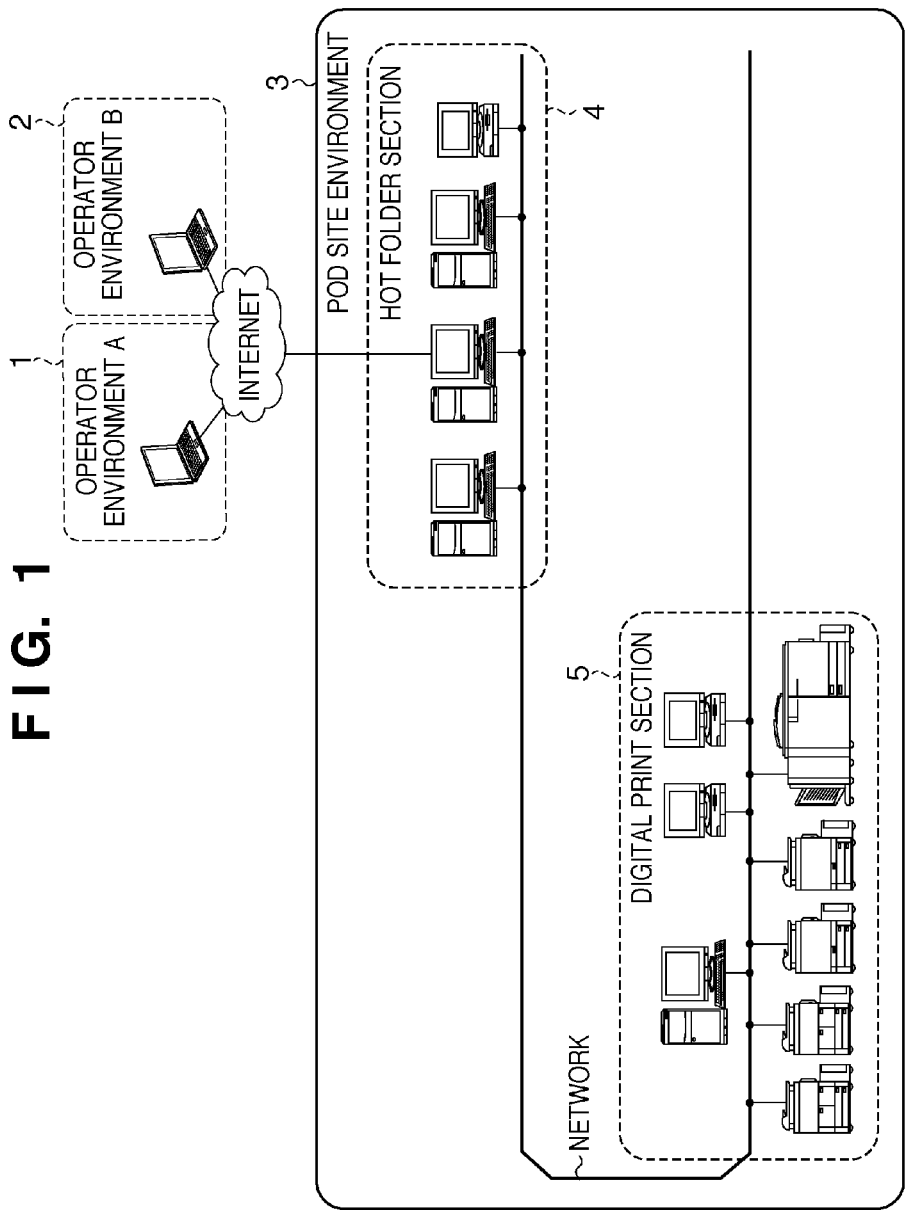
FIG. 1 is a block diagram showing an example of the arrangement of a POD system (print system) according to an embodiment of the present invention.

FIG. 1 is a block diagram showing an example of the overall basic arrangement of a POD system of this embodiment, that is, a print system according to the present invention.

This POD system includes one or a plurality of operator environments 1 and 2, and a POD site environment 3 connected via the Internet (second network).

The operator environments 1 and 2 create data to be printed by the POD site environment 3. In each of the operator environments 1 and 2, an outsourcer who issues a print outsourcing request exists. The operator environments 1 and 2 (operator environments A and B in this case) can issue print job requests and can also confirm statuses of jobs using their client PCs.

On the other hand, the POD site environment 3 includes a hot folder section 4 and digital print section 5 which are normally connected via, for example, a LAN (second network). However, the POD site environment 3 may often include three sections, that is, a post-press section (not shown) in addition to the above two sections, when the functions and performances of a finishing device connected to each digital image forming apparatus such as a digital copying machine or digital multi-function peripheral do not suffice to execute jobs.

The hot folder section 4 corresponding to a file control apparatus according to the present invention serves to append a print instruction to a file entered by a request from each of the operator environments 1 and 2, and to transfer the file to the digital print section 5. The hot folder section 4 also serves as process management. The hot folder section 4 instructs operations to respective processes of the hot holder section 4 and digital print section 5 (and the post-press section if it is added to the configuration) in the POD site environment 3. The hot folder section 4 uniformly manages the workflows of this system including computers and various devices. The hot folder section 4 serves to receive jobs from the aforementioned operator environments 1 and 2, to store jobs from the operator environments 1 and 2, and to efficiently schedule operations in respective devices and operators.

The digital print section 5 executes print processing according to an operation instruction of a print job received from the hot holder section 4. As another POD processing, the digital print section 5 copies paper documents received from an operator using a monochrome MFP or color MFP. Also, the digital print section 5 fulfills the following roles. That is, the digital print section 5 prints out a document/image file received from an operator via a printer driver of a client PC using a print device such as a monochrome MFP or color MFP. Furthermore, the digital print section 5 prints out a scan image file scanned by a scan device using a print device such as a monochrome MFP or color MFP. Moreover, the digital print section 5 prints out a document/image file obtained by editing a received document/image file or scan image file using a print device such as a monochrome MFP or color MFP.

When the post-press section is also included, it controls post-processing devices such as a paper folding device, saddle stitching device, case binding device, trimmer, enclosing device, and collecting device in accordance with an operation instruction of a post-press job received from the hot folder section 4 or digital print section 5. In addition, the post-press section serves to execute finishing processes such as paper folding, saddle stitching, case binding, trimming, enclosing, and collecting with respect to printed sheets output from the digital print section 5.

(Arrangement Example of Hot Folder Section 4)

Figure 2:
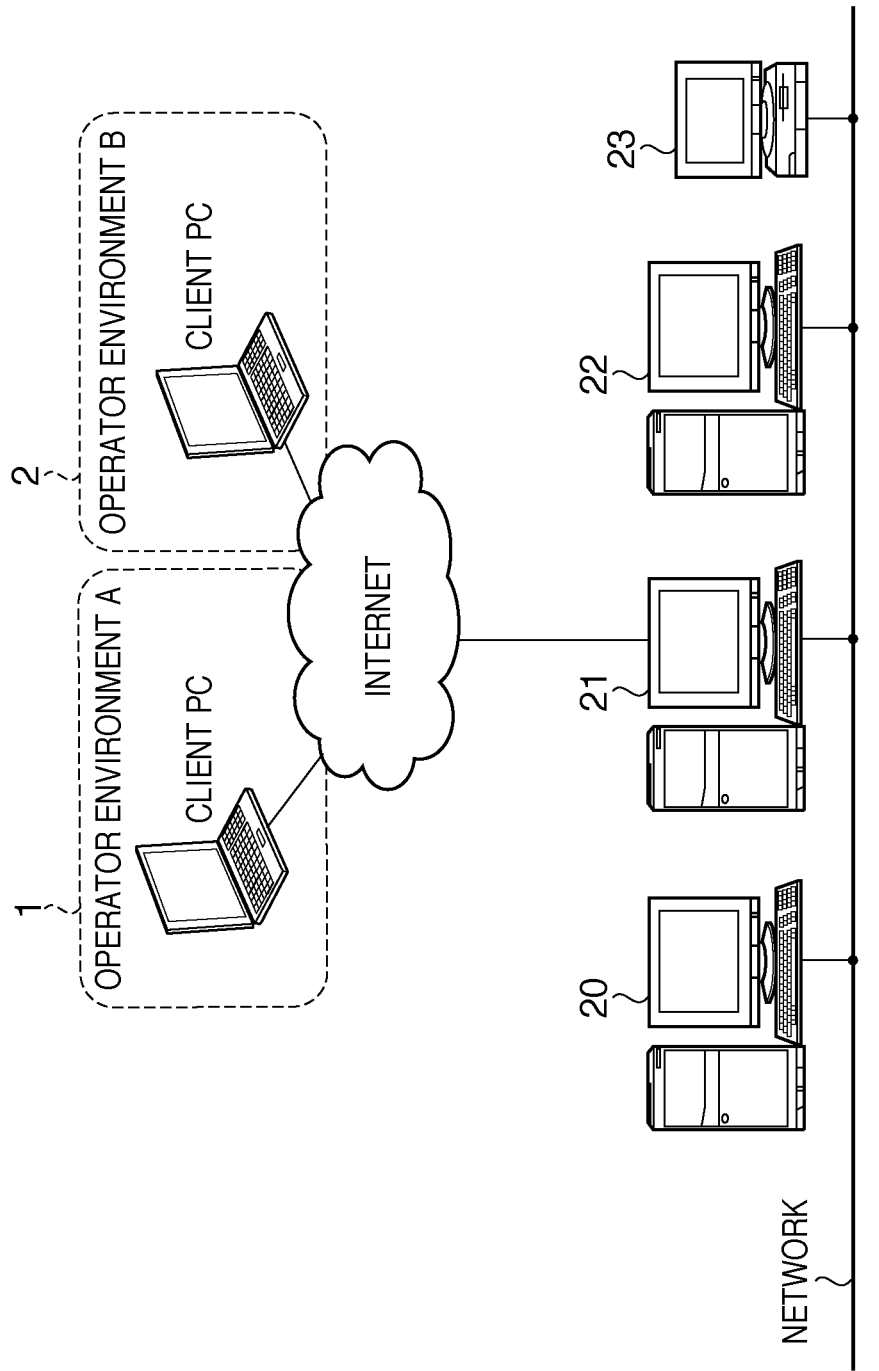
FIG. 2 is a block diagram showing an example of the arrangement of a hot folder section 4 according to the embodiment.

FIG. 2 is a block diagram showing an example of the arrangement of the hot folder section 4 in the POD system (print system).

The hot folder section 4 includes a hot folder server 20 (to be referred to as an HF server hereinafter), a file server 21, hot folder clients 22 and 23 (to be referred to as HF clients hereinafter), and the like, which are connected to a network.

The HF server 20 manages the workflow of the overall system from reception of order until delivery of goods, and controls the HF clients 22 and 23. The file server 21 receives content files to be printed from the operator environments 1 and 2 using the Internet. Also, the file server 21 is a document management server which stores files received from an operator in preparation for a re-outsourcing request using identical documents from the operator. In general, the file server 21 saves image data and print jobs at the time of previous output processing together in association with each other.

Each of the HF clients 22 and 23 is installed with an HF client appli. which sends a file received from an operator to the HF server 20 to output that file in a format that can be processed in the POD system 3 to the digital print section 5. For example, upon reception of a content file from an operator, the content file is converted into a print job appended with a print setting information file on the HF client 22 or 23, and the print job is transmitted to the digital print section 5.

The print setting information file used among the HF server 20, file server 21, and HF clients 22 and 23 in the hot folder section 4 is called a JDF (Job Definition Format) file. Information of this JDF file is exchanged using, for example, a job ticket that describes an operation instruction of a job. Then, the JDF file provides automation of the total workflow in cooperation with the digital print section 5 (and also the post-press section) with a focus on the hot folder section 4 by transferring print jobs and issuing control commands.

(Arrangement Example of Digital Print Section 5)

Figure 3:
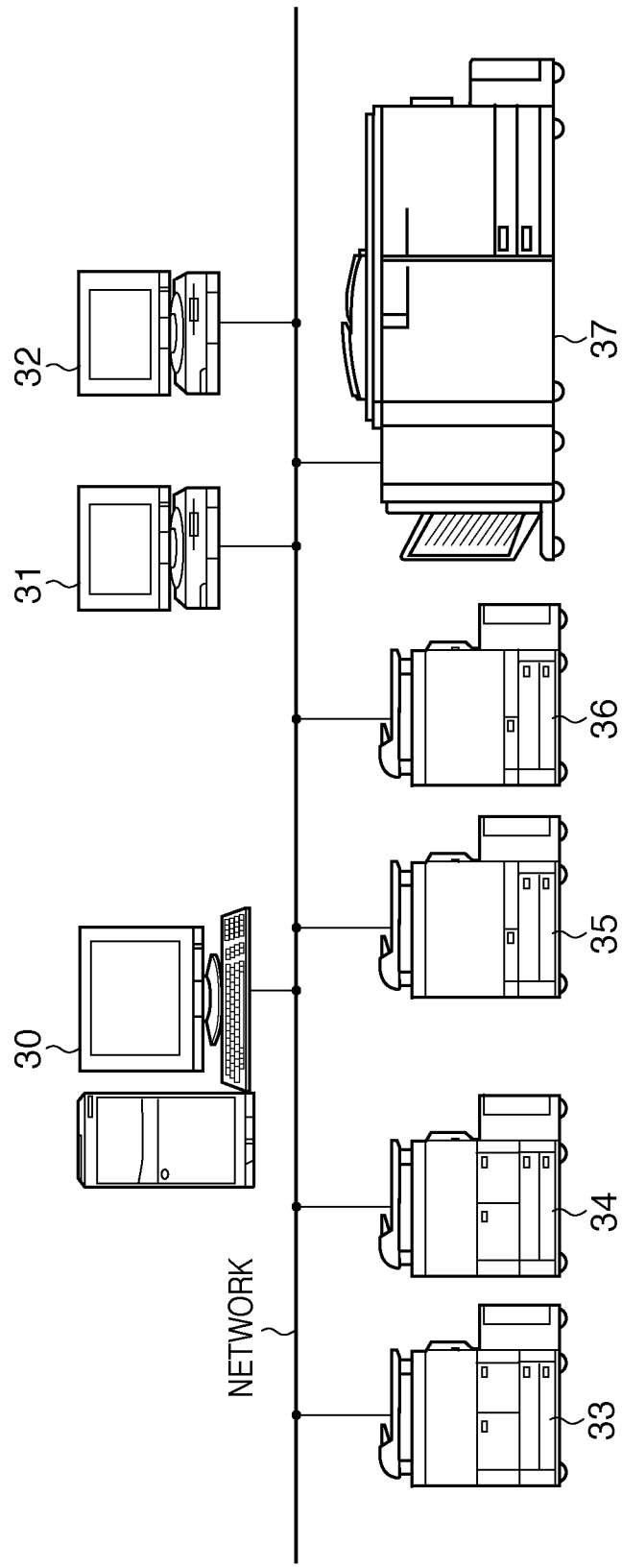
FIG. 3 is a block diagram showing an example of the arrangement of a digital print section 5 according to the embodiment.

FIG. 3 is a block diagram showing an example of the arrangement of the digital print section 5 in the POD system (print system).

The digital print section 5 includes one or a plurality of devices, that is, a print server 30, client PCs 31 and 32, color MFPs 35, 36, and 37, and monochrome MFPs 33 and 34, which are connected to a network.

The print server 30 has two roles. The first role is exchange of information with devices outside the digital print section 5. That is, with this role, image information, setting information, and the like of a job to be received are input to the print server 30, and the print server 30 notifies an external device of information such as a status upon completion of that job. The second role is management control inside the digital print section 5. That is, the print server 30 uniformly manages externally input jobs and jobs created inside the digital print section 5. The print server 30 can monitor the statuses of all devices and all jobs in the digital print section 5. At the same time, the print server 30 can execute various kinds of control such as suspension control, setting change control, and printing resume control of jobs, or duplicate control, movement control, and deletion control of jobs.

Each of the client PCs 31 and 32 has a role as an assistant which monitors and controls devices and jobs managed in the print server 30. As another POD service, each of the client PCs 31 and 32 has a role of editing an input application file, a print instruction, or an entry of a print ready file.

The color MFPs 35, 36, and 37, and the monochrome MFPs 33 and 34 are image forming apparatuses having various functions such as a scan function, print function, and copy function, and are selectively used as their usages since the color MFPs and monochrome MFPs have different speeds and costs. In the example of FIG. 3, a finisher device is connected to the color MFP 37.

<Functional Arrangement Example of POD System of this Embodiment>

Figure 4:
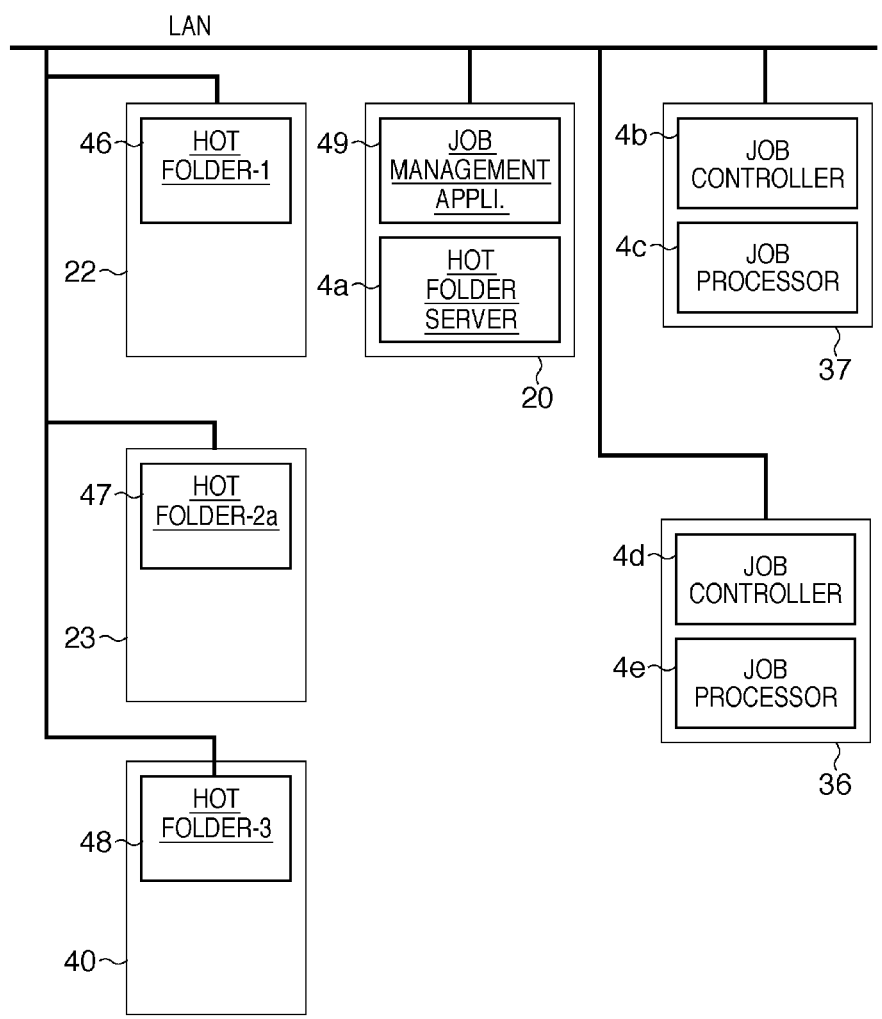
FIG. 4 is a block diagram showing an example of the arrangement of a POD system (print system) according to the first embodiment.

FIG. 4 is a block diagram showing an example of the functional arrangement of the overall POD system (print system) used to explain the present invention. FIG. 4 is a block diagram showing components and functions required to explain the present invention, which are extracted from the block diagram showing the arrangement of the overall POD system (print system) shown in FIG. 1. This embodiment will be explained below using this block diagram.

In FIG. 4, assume that the hot folder section 4 in the print system is configured by HF client PCs 22, 23, and 40, and an HF server PC 20. The digital print section 5 is configured by color MFPs 37 and 36. The internal arrangement of each of the color MFPs 37 and 36 includes a color MFP main body which processes from reception of a print job until output of printed documents according to information recorded in the job, and an inline finisher connected as a printed document convey path from the color MFP main body. The aforementioned devices including the HF client PC 22, HF server PC 20, color MFP 37, and so forth are connected via a network (first network) such as a LAN.

As in FIG. 29A, reference numeral 4a denotes an HF server application which runs on the HF server PC 20, and includes a transmission queue 44 (not shown) required to transfer print data to a print device such as the color MFP 37. Files set in the transmission queue 44 undergo transmission processing to the color MFPs 36 and 37 in the order they were set. Reference numeral 49 denotes a job management application, which runs on the HF server PC 20, and is used to monitor print jobs transmitted from the HF server appli. 4a, to monitor statuses of print jobs in the color MFP 37, and so forth.

Reference numeral 4b denotes a job controller which is installed in the color MFP 37, and includes a print queue 45 (not shown). Jobs set in the print queue 45 undergo print processing of the color MFP 37 in the order they were set. A print job which has undergone RIP processing is set in the print queue 45, and is subject to various restrictions of the color MFP 37. Reference numeral 4c denotes a job processor which is installed in the color MFP 37, and executes print processing of jobs recorded in the print queue 45. A job controller 4d and job processor 4e in the color MFP 36 are the same as the job controller 4b and job processor 4c. Note that a print job before the RIP processing may be set in the print queue.

In this embodiment, assume that an entry of a PDF file to HF client applis. 46 to 48 by the user issues a print start instruction. An entry of a PDF file may be attained by an operator layer by dragging & dropping a PDF file onto a folder using a mouse pointer or by a program of, for example, a batch file which copies a PDF file. Upon detection of an entry of a PDF file by an event, the HF client appli. 46 or the like receives the entered PDF file and transfers it to the HF server 20. The HF server 20 creates a print job from the received PDF file, and transfers the print job to the instructed color MFP 37 or 36. That is, the HF client appli. 46 or the like configures a receiving unit.

First Embodiment

Arrangement Example of PC (Personal Computer) of this Embodiment (Hardware Arrangement Example of PC)

Figure 5:
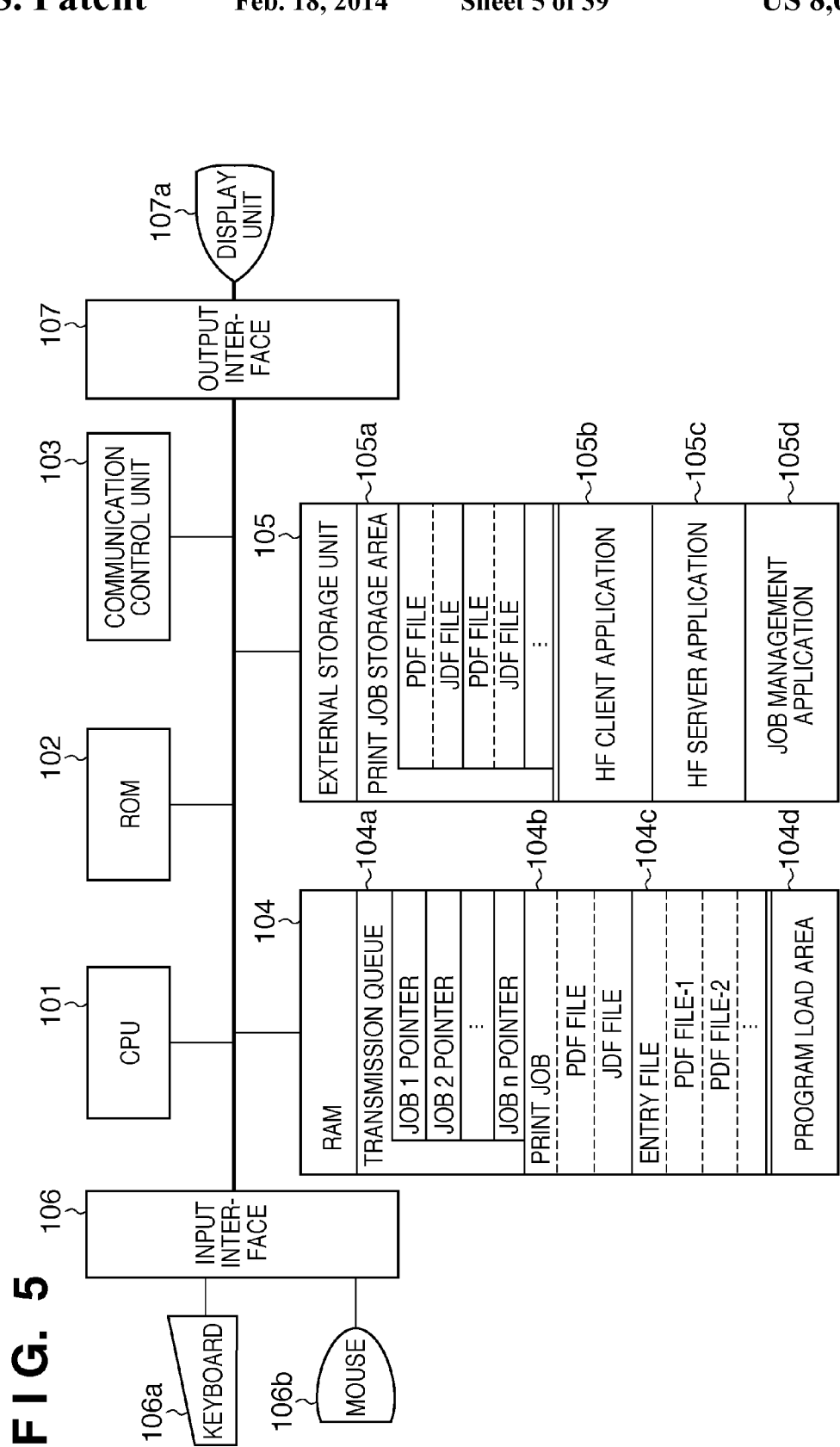
FIG. 5 is a block diagram showing an example of the arrangement of a personal computer (PC) according to the embodiment.

FIG. 5 is a block diagram showing an example of the hardware arrangement of a PC (personal computer) which serves as the HF client PCs 22, 23, and 40, and the HF server PC 20 of the first embodiment. Note that FIG. 5 exemplifies the arrangement with which a single PC executes functions of the HF client PCs 22, 23, and 40, and the HF server PC 20. These functions may be separated into a plurality of PCs as the HF client PCs 22, 23, and 40, and the HF server PC 20, or may separate a plurality of PCs as the HF client PCs 22, 23, and 40.

Referring to FIG. 5, reference numeral 101 denotes a CPU for arithmetic control, which controls the operation of the overall PC. Reference numeral 102 denotes a ROM which stores an initial IO program to be executed by the CPU 101 and permanent parameters. Reference numeral 103 denotes a communication control unit which is required to connect the PC to an external LAN or the Internet.

Reference numeral 104 denotes a work RAM which temporarily stores data during the operation of the CPU 101. The RAM 104 also has an area on which an application program stored in an external storage unit 105 (to be described later) is loaded and is executed by the CPU 101. In this embodiment, a storage area 104a of a transmission queue in the HF server PC 20 is assured on the RAM 104. In this example, pointers to jobs 1, 2, . . . , n are queued in the storage area 104a in the transfer order. Also, a storage area 104b of one print job, which is generated by creating a JDF file including order data in correspondence with a PDF file entered in the HF client PC 22, 23, or 40, is assured on the RAM 104. This print job is held in the external storage unit 105 (to be described later), and is transferred to the corresponding color MFP 37 or 36 in accordance with the order of the transmission queue. Furthermore, a storage area 104c of entry files, which temporarily stores PDF files entered in the HF client PCs 22, 23, and 40, is assured on the RAM 104. Moreover, a program load area 104d is assured on the RAM 104, as described above. Note that the storage areas shown in FIG. 5 are those required to execute this embodiment, and general-purpose storage areas required for other processes are not shown.

Reference numeral 105 denotes an external storage unit such as a disk, which stores application programs to be executed by the CPU 101 and data to be nonvolatilely held. In this embodiment, on the external storage unit 105, a storage area 105a of a plurality of print jobs, which are generated by creating JDF files including order data in correspondence with PDF files entered in the HF client PCs 22, 23, and 40, is assured. These plurality of print jobs are transferred to the corresponding color MFP 37 or 36 in accordance with the order of the transmission queue. Also, a storage area 105b of an application program which makes this PC serve as the HF client PCs 22, 23, and 40, is assured on the external storage unit 105. Furthermore, storage areas 105c and 105d of application programs, which make this PC serve as the HF server PC 20, are assured on the external storage unit 105. The storage area 105c stores the HF server application of the HF server PC 20. The storage area 105d stores the job management application of the HF server PC 20. Note that the storage areas shown in FIG. 5 are those required to execute this embodiment, and general-purpose storage areas for an OS, basic program, and the like are not shown.

Reference numeral 106 denotes an input interface, which interfaces inputs from peripheral devices. To the input interface 106, for example, a keyboard 106a and a mouse 106b as a pointing device are connected. Reference numeral 107 denotes an output interface, which interfaces outputs to peripheral devices. To the output interface 107, for example, a display unit 107a is connected. The input/output peripheral devices are not limited to such specific examples, and are connected according to the roles and functions of the PC.

(Software Configuration Example of PC)

Figure 6A:
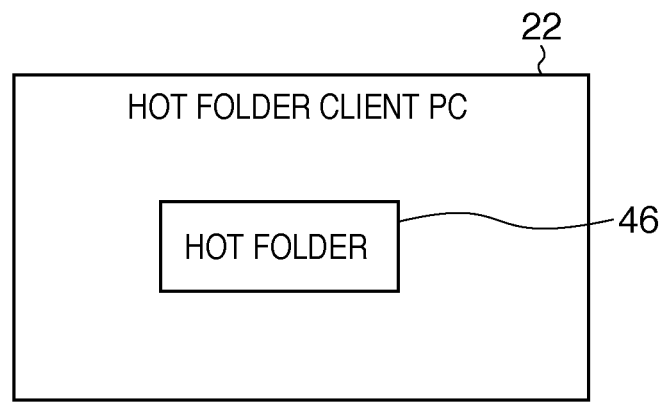
FIG. 6A is a block diagram showing an example of the arrangement of an HF client PC according to the embodiment.
Figure 6B:
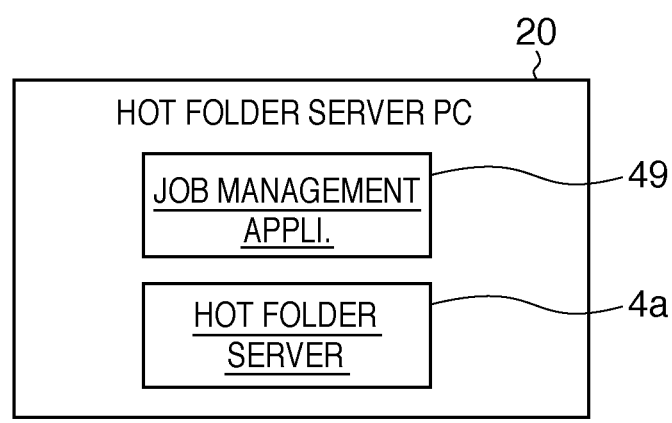
FIG. 6B is a block diagram showing an example of the arrangement of an HF server according to the embodiment.

FIGS. 6A and 6B are block diagrams showing examples of the software configurations of the HF client PC 22 and HF server PC 20.

Referring to FIG. 6A, reference numeral 46 denotes an HF client appli. used to enter a PDF file. Referring to FIG. 6B, reference numeral 4a denotes an HF server appli., which manages the plurality of HF client applis. 46 to 48. Reference numeral 49 denotes a job management appli., which monitors and displays a status of a print job transmitted from the HF server appli. 4a.

Figure 7A:
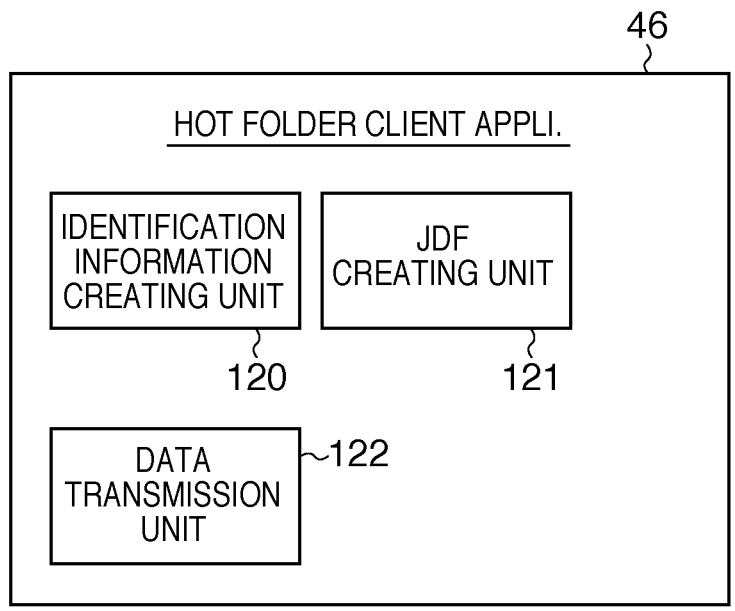
FIG. 7A is a block diagram showing an example of the detailed arrangement of an HF client appli. according to the first embodiment.
Figure 7B:
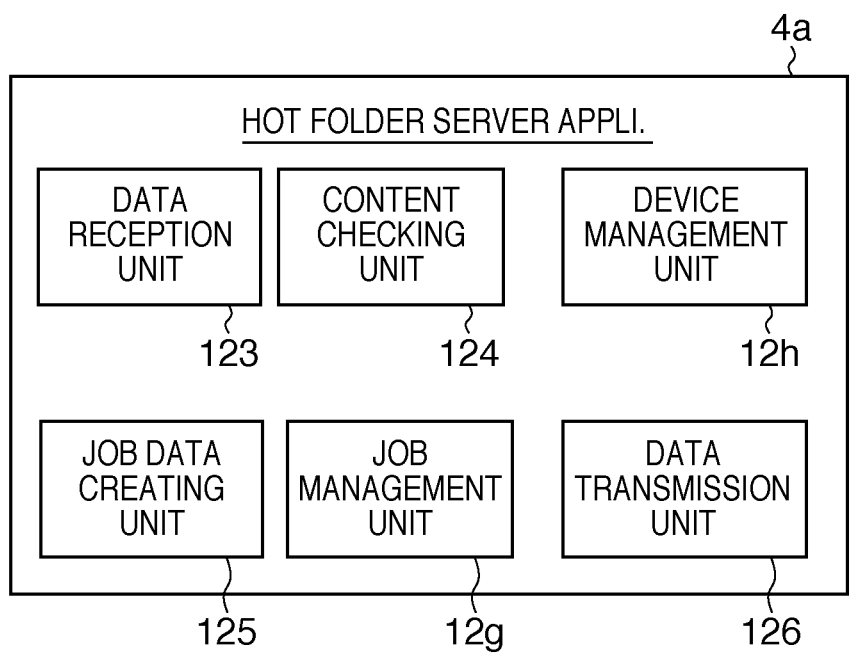
FIG. 7B is a block diagram showing an example of the detailed arrangement of an HF server appli. according to the first embodiment.

FIGS. 7A to 7C are block diagrams showing the further detailed configurations of the HF client appli. 46, HF server appli. 4a, and job management appli. 49.

Figure 8:
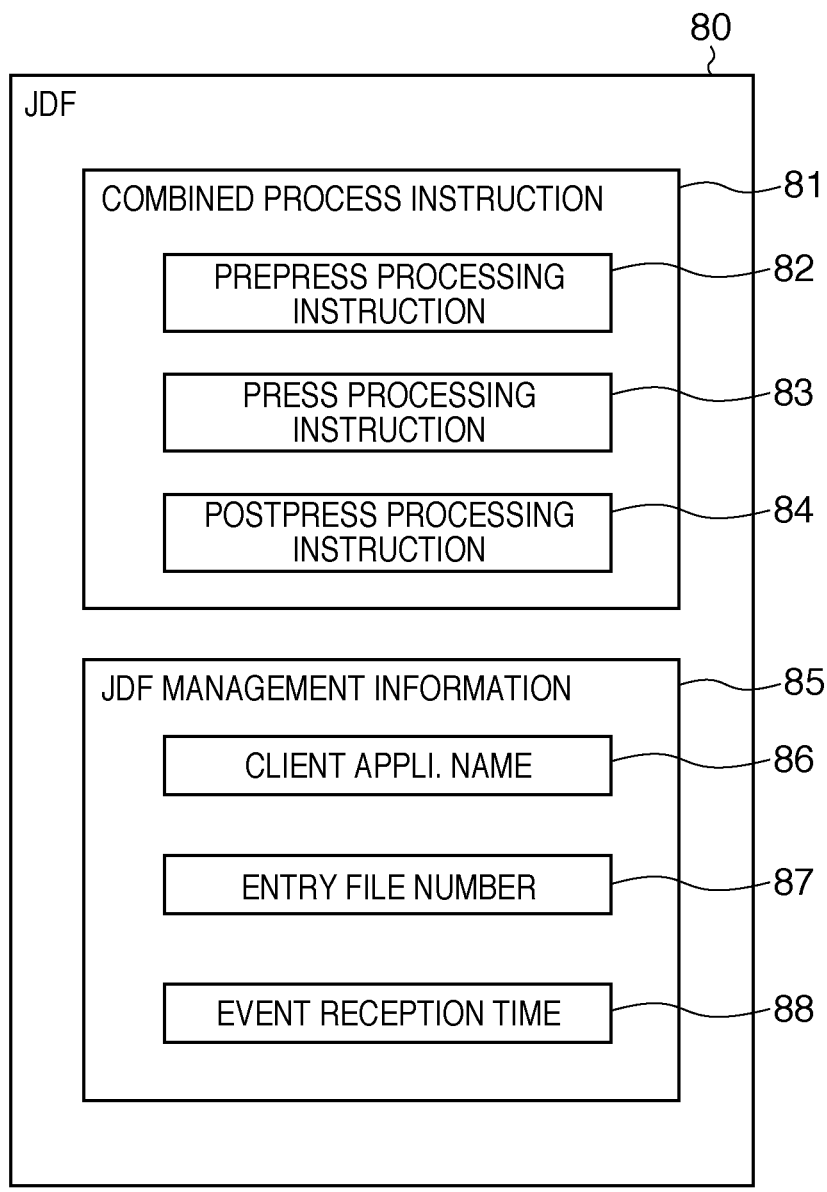
FIG. 8 is a first view for explaining an example of the configuration of a JDF according to the embodiment.

In the HF client appli. 46 shown in FIG. 7A, reference numeral 120 denotes an identification information creating unit, which creates identification information shown as JDF management information in FIG. 8 with respect to a PDF file entered in the HF client appli. 46. This identification information creating unit 120 creates identification information including an HF client name that allows identifying a print job, a serial number sequentially assigned to a PDF file entered in the HF client appli., and an entry date and time of the PDF file. Reference numeral 121 denotes a JDF creating unit (print setting information creating unit) which creates a JDF file as a print setting information file based on print setting information set in association with the HF client appli. 46. Reference numeral 122 denotes a data transmission unit which transmits the entered PDF file and the JDF file created by the JDF creating unit 121 to the HF server appli. 4a.

In the HF server appli. 4a in FIG. 7B, reference numeral 123 denotes a data reception unit which receives the PDF file and JDF file transmitted from the data transmission unit 122 of the HF client appli. 46. The HF server appli. 4a checks if the received PDF file to be printed is supported, using a content checking unit 124. As the check method, it is checked if the received file has a file type to be printed or the file format version of the received file is checked. A job data creating unit 125 executes MIME encoding using the received JDF file and PDF file and creates JDF job data as a print job compliant with the JDF specification. Reference numeral 126 denotes a data transmission unit which transmits the print job created by the job data creating unit 125 to the job management appli. 49.

Reference numeral 12g denotes a job management unit, which sorts, based on the order data in the JDF file, the order upon transmitting the print job created by the job data creating unit 125 to the job management appli. 49 to match the order of entries of PDF files. Reference numeral 12h denotes a device management unit which acquires and holds process restriction information associated with a print job from the color MFPs 37 and 36 as image forming apparatuses. In an embodiment to be described later, the HF client appli. 46 implements processing for changing a transmission destination device of a print job, dividing a print job, and so forth based on this process restriction information.

Note that the HF server appli. 4a manages print jobs transmitted from the HF client appli. Note that when a status of a print job need not be displayed on a display unit such as a CRT, the HF server appli. 4a may directly transmit a print job to a printer such as the color MFP 37 or 36. In this embodiment, at the time of HF creation, a print destination is set in advance for each HF client appli.

In the job management appli. 49 shown in FIG. 7C, reference numeral 127 denotes a data reception unit which receives print job data transmitted from the data transmission unit 126 of the HF server appli. 4a. Reference numeral 128 denotes a control unit which controls the processing of the overall job management appli. Reference numeral 12b denotes a job ticket interpreting unit which interprets a JDF file as a job ticket recorded in the received print job. Reference numeral 12c denotes a content exportation control unit which controls processing for exporting a PDF file as content data from a job recorded in the job management appli. 49. Reference numeral 12d denote a content creating unit which actually creates a PDF file upon exporting a content from a job. The content creating unit 12d creates a file under a folder of a path designated by the user using the keyboard or exchanges the page order of a content according to an instruction from the content exportation control unit 12c.

Reference numeral 12e denotes a job management information updating unit which updates information recorded in a job recording unit 12f based on the result received by the data reception unit 127. Reference numeral 129 denotes a display unit which displays job information managed by the job management information updating unit 12e on a screen. Reference numeral 12a denotes a print job transmission and updating unit. The print job transmission and updating unit 12a transmits a job from the job management appli. 49 to the color MFP 37 or 36. The print job transmission and updating unit 12a receives status information of a job from the color MFP 37 or 36, and records the status information of the job in the job recording unit 12f. Then, the print job transmission and updating unit 12a displays the updated status information on the screen using the display unit 129 (see FIGS. 14A to 14D).

(Configuration Example of Job Ticket of this Embodiment)

An example of a job ticket which records print setting information of this embodiment will be described below using FIGS. 8 and 9. This example will explain the JDF as the job ticket.

FIG. 8 is a view showing an example of the structure of a job ticket JDF as print setting information.

Reference numeral 80 denotes entire JDF data. A Combined process instruction field 81 indicates Combined Process processing which combines the following Prepress processing 82, Press processing 83, and Postpress processing 84 into one processing. A field 82 describes a plurality of Prepress processing instructions indicating, for example, what kind of image processing is applied to content data such as PDF data, and how to lay out the content data. A field 83 describes a plurality of Press processing instructions indicating, for example, how to output image data created by the Prepress processing 82 onto documents. A field 84 describes Postpress processing instructions indicating what kind of post-processing (e.g., case binding and the like) is to be applied to the documents output according to the instructions of the Press processing 83.

Normally, in, for example, the color MFP 37 which executes digital print processing, a bookbinding result obtained after execution of the Prepress processing, Press processing, and Postpress processing to a single print job input is only one output. In this manner, when the user wants to instruct to process the Prepress processing+Press processing+Postpress processing for a single data input at the same time, and to output only one output, the Combined Process instruction is used. The Combined Process instruction is always used as an instruction to a digital image forming apparatus such as an MFP which has at least two out of the Prepress processing, Press processing, and Postpress processing.

Reference numeral 85 denotes JDF management information which identifiably stores an order of entries of a PDF file appended to the JDF data 80 into the HF client appli. In this specification, this JDF management information is also called identification information or order data. The JDF management information 85 is used to sort the print order to match the order of entries into an identical client appli. The JDF management information 85 includes a client appli. name (to be also referred to as a folder name) 86 to which the PDF file is entered, an entry file number 87 as a serial number, and an event reception time 88 as an entry time.

Figure 9:
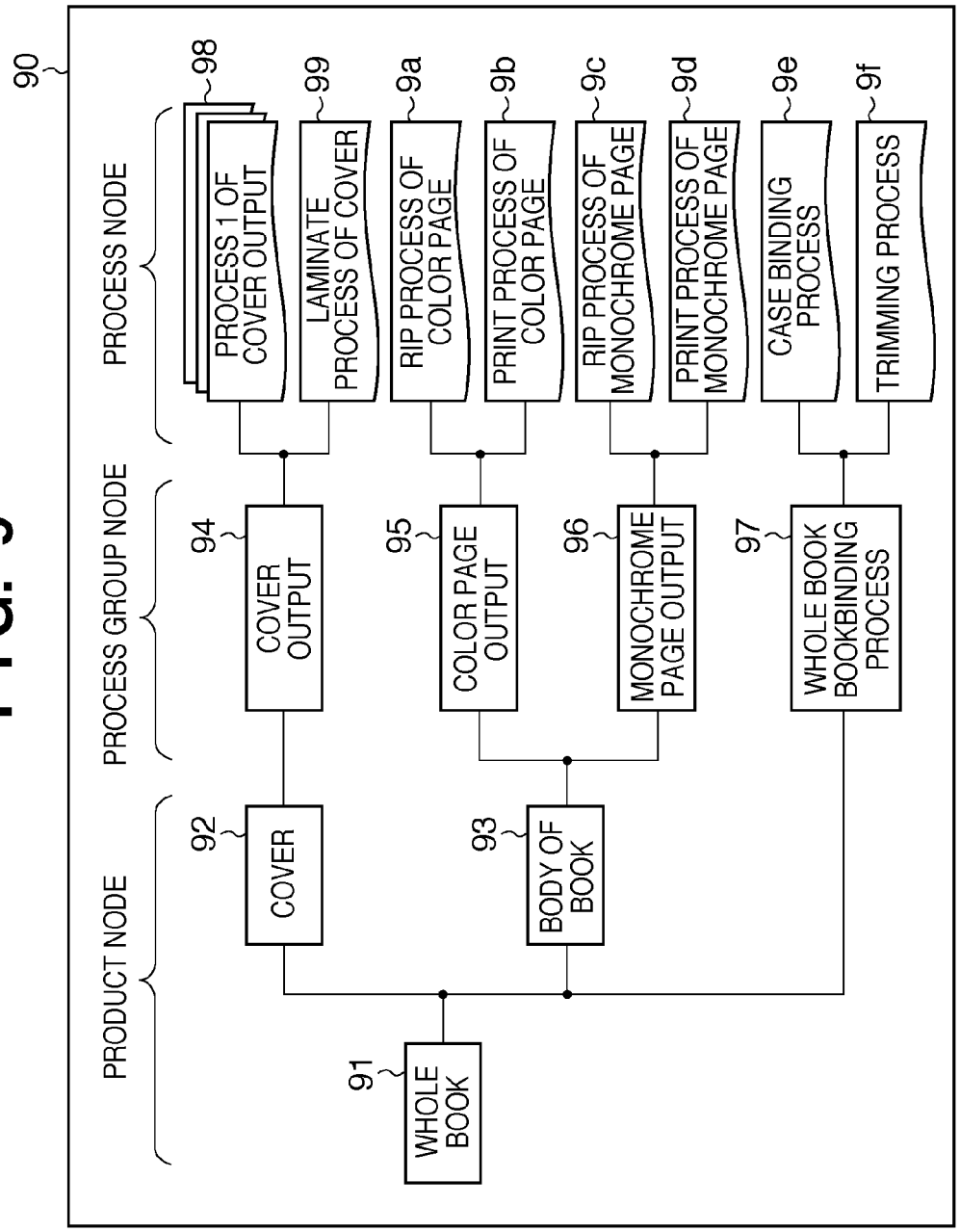
FIG. 9 is a second view for explaining an example of the configuration of the JDF according to the embodiment.

FIG. 9 is a view showing another example of the job ticket structure used in, for example, the POD system. JDF data which expresses a job ticket 90 is described in an XML format, and can be expressed by a hierarchical structure of nodes. FIG. 9 is a hierarchical view showing an example of bookbinding by means of JDF data. On the other hand, FIG. 8 shows the JDF structure by means of the types of execution processes.

A "book" 91 delivered to an end user is finished via various processes including creation of a cover 92, creation of contents 93, and bookbinding of them. In JDF data, processes required to form physical output matters upon configuring output matters are called product nodes. Processes required to form product nodes are called process nodes, and groups of some process nodes as elements in an intermediate stage for creating product nodes are called process group nodes distinctly. FIG. 9 shows a cover output process 94, color page output process 95, monochrome page output process 96, and bookbinding process 97 of the entire book.

Note that the Prepress processing 82 in FIG. 8 corresponds to a process 9a as RIP processing of color pages and a process 9c as RIP processing of monochrome pages in the process nodes. The Press processing 83 corresponds to a cover output process 1 98, cover laminate process 99, color page print process 9b, and monochrome page print process 9d. The Postpress processing corresponds to a case binding process 9e and trimming process 9f.

<Arrangement Example of Color MFP of this Embodiment>

(Overall Arrangement Example of Color MFP)

Figure 10:
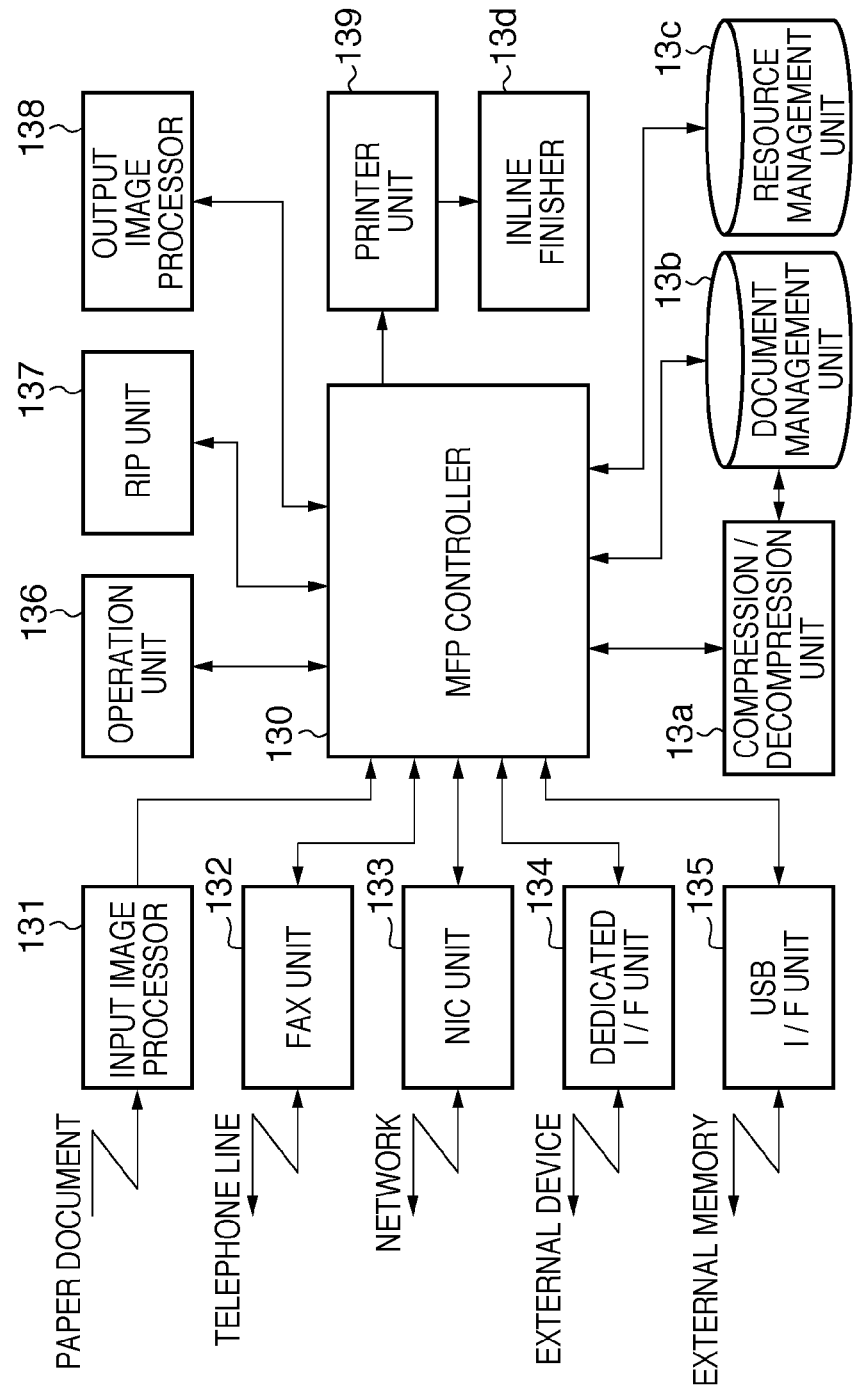
FIG. 10 is a block diagram showing an example of the arrangement of a color MFP according to the embodiment.

FIG. 10 is a block diagram for explaining an example of the overall arrangement of the color MFP in detail. Note that components shown in FIG. 10 can be implemented by hardware, software, or firmware that combines them.

An MFP is an apparatus which includes a memory such as a hard disk that can store a plurality of job data. For example, the MFP includes a copy function which allows a printer unit to print job data output from a scanner via the memory. Also, the MFP includes a print function which allows the printer unit to print job data output from an external apparatus such as a computer via the memory. In this way, the MFP is an image forming apparatus including a plurality of functions. As the MFP, a full-color device and monochrome device are available, and the MFPs 37 and 36 are color MFPs.

The arrangement of this print system has an MFP (multi-function image forming apparatus) having a plurality of functions, as described above. However, the arrangement may include an image forming apparatus including only a print function+finishing function. Also, the arrangement may include only an image forming apparatus of either one type. The arrangement may include a plurality of image forming apparatuses of both types. The arrangement of the print system is not particularly limited as long as the arrangement can implement the control of this embodiment.

As shown in FIG. 10, the color MFP includes respective interface elements which interface with external devices. Reference numeral 131 denotes an input image processor which reads an image on a paper document or the like, and applies image processing to the read image data. Reference numeral 132 denotes a FAX unit which is represented by a facsimile device, and exchanges images using a telephone line. Reference numeral 133 denotes a NIC (Network Interface Card) unit which exchanges image data and device information using a network. Reference numeral 134 denotes a dedicated interface unit which exchanges information such as image data with an external device. Reference numeral 135 denotes a USB (Universal Serial Bus) interface (USB I/F) unit which exchanges image data and the like with a USB device represented by a USB memory (a kind of removable media).

An MFP controller 130 assumes the role of traffic control, that is, it temporarily saves image data and decides routes as usage of the MFP. Note that a more detailed arrangement of the MFP controller 130 will be described later with reference to FIG. 11.

Reference numeral 13*b* denotes a document management unit, which includes a memory such as a hard disk that can store a plurality of image data. For example, a control unit included in the image forming apparatus (for example, a CPU of the MFP controller 130) mainly controls this document management unit 13*b*. The control unit controls to store a plurality of types of image data input via the interface elements in the hard disk. The plurality of types of image data include image data from the input image processor 131, image data of a facsimile job input via the FAX unit 132, and image data from an external apparatus such as a computer input via the NIC unit 133. Also, the plurality of types of image data include those input via the dedicated I/F unit 134 and USB I/F unit 135. The control unit then controls to read out image data stored in the hard disk as needed, to transfer the readout image data to an output unit such as a printer unit 139, and to execute output processing such as print processing by the printer unit 139. Also, the control unit controls to transfer image data read out from the hard disk in response to an instruction from an operator via an operation unit 136 to an external apparatus such as a computer or another image forming apparatus.

Upon storing image data in the document management unit 13*b*, image data is stored after compression as needed. Conversely, upon reading out image data stored after compression, the readout image data is decompressed to original image data. These processes are executed via a compression/decompression unit 13*a*. Upon exchanging data via a network, it is generally known that compressed data such as JPEG data, JBIG data, or ZIP data is used. After such data is input to the color MFP, that data is unpacked (decompressed) by the compression/decompression unit 13*a*.

Reference numeral 13*c* denotes a resource management unit, which stores various parameter tables to be commonly handled, such as fonts, color profiles, and gamma tables. Such parameter table can be called as needed, and a new parameter table can be stored or can be updated by modification.

When PDL data is input, the MFP controller 130 controls an RIP unit 137 to apply RIP (Raster Image Processor) processing to the PDL data. Also, the MFP controller 130 controls an output image processor 138 to apply image processing required for printing to an image to be printed. Furthermore, the MFP controller 130 can store intermediate data of image data created at that time or print ready data (bitmap data for printing or compressed data thereof) in the document management unit 13*b* again as needed.

Each image data, which is stored in the document management unit 13*b* and is prepared for image formation, is sent to the printer unit 139 which performs image formation. Print document sheets printed out by the printer unit 139 are fed into an inline finisher 13*d* as a post-processing unit, and undergo sorting processing and finishing processing of the sheets.

The MFP controller 130 assumes the role of smoothly flowing jobs, and switches paths according to modes of using the color MFP. Examples of such modes are listed below. In the following list, the processes of the compression/decompression unit 13*a* used as needed, the inline finisher 13*d* as the post-processing unit, and the MFP controller 130 as the core of the whole apparatus are omitted, so that approximate sequences can be recognized.

(A) FAX reception function: FAX unit→a output image processor→a printer unit (B) Network print: NIC unit→RIP unit→output image processor→printer unit (C) Print from external apparatus: dedicated I/F unit→a output image processor→printer unit (D) Print from external memory: USB I/F unit→RIP unit→output image processor→printer unit (E) Box print function: document management unit→printer unit Note that the box print function is a processing function of the MFP using the document management unit 13*b*, and is a function of temporarily saving data by dividing the memory in the document management unit 13*b* for respective jobs and respective users, and inputting/outputting data by combining a user ID and password.

The operation unit 136 is used to select various flows and functions described above, and to input operation instructions. Note that since a display device of the operation unit 136 gains a higher resolution, image data stored in the document management unit 13*b* may be previewed, and may be printed if it is OK after confirmation.

Figure 11:
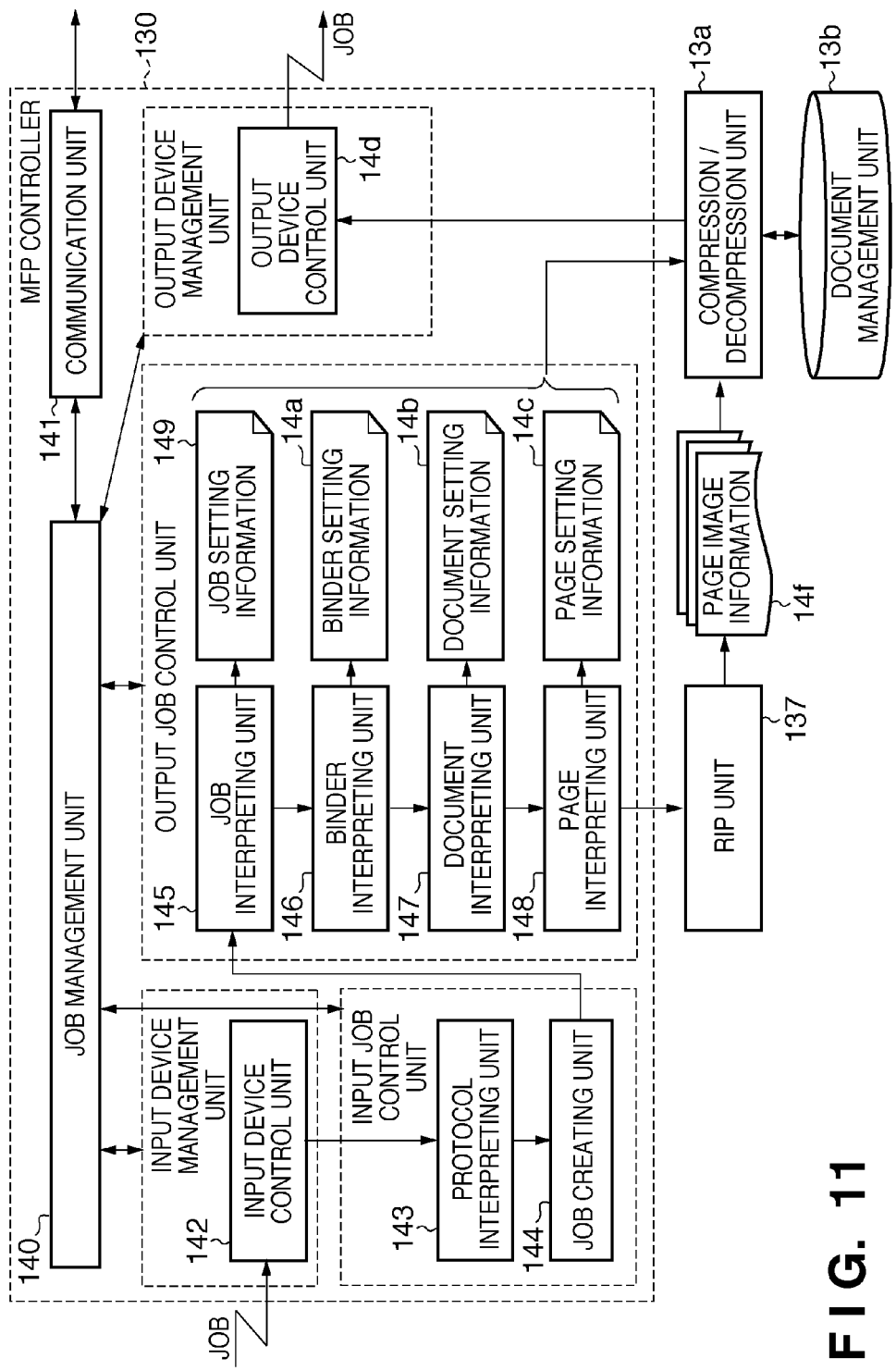
FIG. 11 is a block diagram showing an example of the arrangement of an MFP controller shown in FIG. 10.

FIG. 11 is a block diagram for explaining an example of the arrangement of the MFP controller 130 in detail.

The MFP controller 130 roughly includes five blocks. More specifically, the MFP controller 130 has an input device management unit which manages input devices, and an input job control unit which interprets an input job. Also, the MFP controller 130 has an output job control unit which organizes job setting information, and an output device management unit which assigns output devices. Furthermore, the MFP controller 130 has a job management unit 140 which transfers instructions from the HF server appli. 4*a* and job management appli. 49 to the MFP controller 130 and controls a print job.

The input device management unit includes an input device control unit 142. Input signals to the input device management unit include PDL data and image data from the client PC 31 or 32, and JDF data and PPML data from the HF server appli. 4*a*, job management appli. 49, and job management unit 140.

The input job control unit includes a protocol interpreting unit 143 and job creating unit 144. The protocol interpreting unit 143 receives a series of operation requests sent from the input device control unit 142 as instruction signals called commands (protocols), and interprets an overview of the operation requests to convert these requests into operation procedures that can be understood inside the MFP. On the other hand, the job creating unit 144 creates an internal job that describes processes inside the MFP. The created internal job includes a scenario which defines processes to be applied inside the MFP and a destination, and flows inside the MFP according to the scenario.

The output job control unit creates job setting information and image information using a job interpreting unit 145, binder interpreting unit 146, document interpreting unit 147, and page interpreting unit 148. The job interpreting unit 145 interprets details of job setting information 149 associated with a whole job such as a document name to be printed, the number of copies to be printed, designation of a discharge tray as an output destination, and a binder order of a job including a plurality of binders. The binder interpreting unit 146 interprets details of binder setting information 14*a* associated with a whole binder such as a setting of a bookbinding method, a staple position, and a document order of a binder including a plurality of documents. The document interpreting unit 147 interprets details of document setting information 14*b* associated with a whole document such as a page order of a document including a plurality of pages, designation of double-sided printing, and addition of a cover and slip sheet. The page interpreting unit 148 interprets details of page setting information 14c associated with various setting pages such as a resolution of an image, and an orientation of an image (landscape/portrait). Also, when PDL data is input, the page interpreting unit 148 calls the RIP unit 137 to apply rasterize processing. Note that upon creating image information, the RIP unit 137 is called to create page image information 14f by the rasterize processing. The page image information 14f is compressed by the compression/decompression unit 13a, and is then stored in association with setting information in the document management unit 13b.

The output device management unit includes an output device control unit 14d. Image information saved in the document management unit 13b is decompressed by the compression/decompression unit 13a, and is read out together with the associated setting information. Then, the setting information and image information are sent as a pair to the output device management unit. The output device control unit 14d schedules processes inside the MFP in association with devices to be used such as the printer unit and inline finisher.

A communication unit 141 communicates with the HF server appli. 4a and job management appli. 49, exchanges a print status, and receives a processing instruction of a print job. The job management unit 140 receives PPML data and JDF data as a print job from the HF server appli. 4a and job management appli. 49 via the communication unit 141, and also receives a start, suspension, or cancel instruction of a print job, and a change instruction of the processing contents. Also, the job management unit 140 sends an instruction to change processes of a print job to the respective control units in the MFP and returns a status of a print job which is being executed in the MFP, in response to few instruction contents.

<Operation Example of POD System of First Embodiment>

An operation example of the POD system which allows to print PDF files in the order of entries to the HF client appli. according to the first embodiment will be described below with reference to FIGS. 12 and 13.

(Detailed Operation Example of HF Client Appli. 46 and HF Server Appli. 4a)

Figure 12:
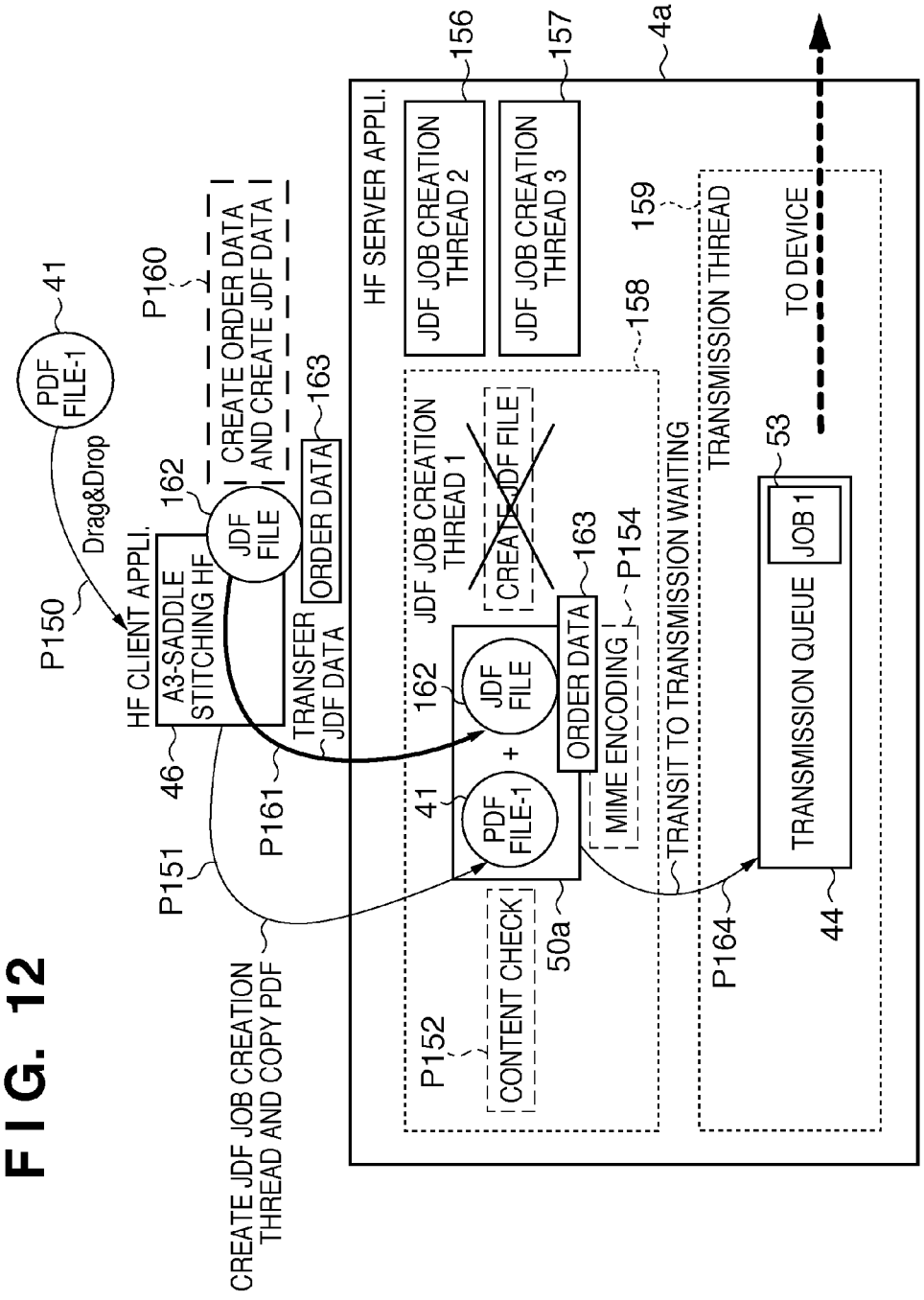
FIG. 12 is a view for explaining a processing example in an HF client PC and HF server PC according to the first embodiment.
Figure 30:
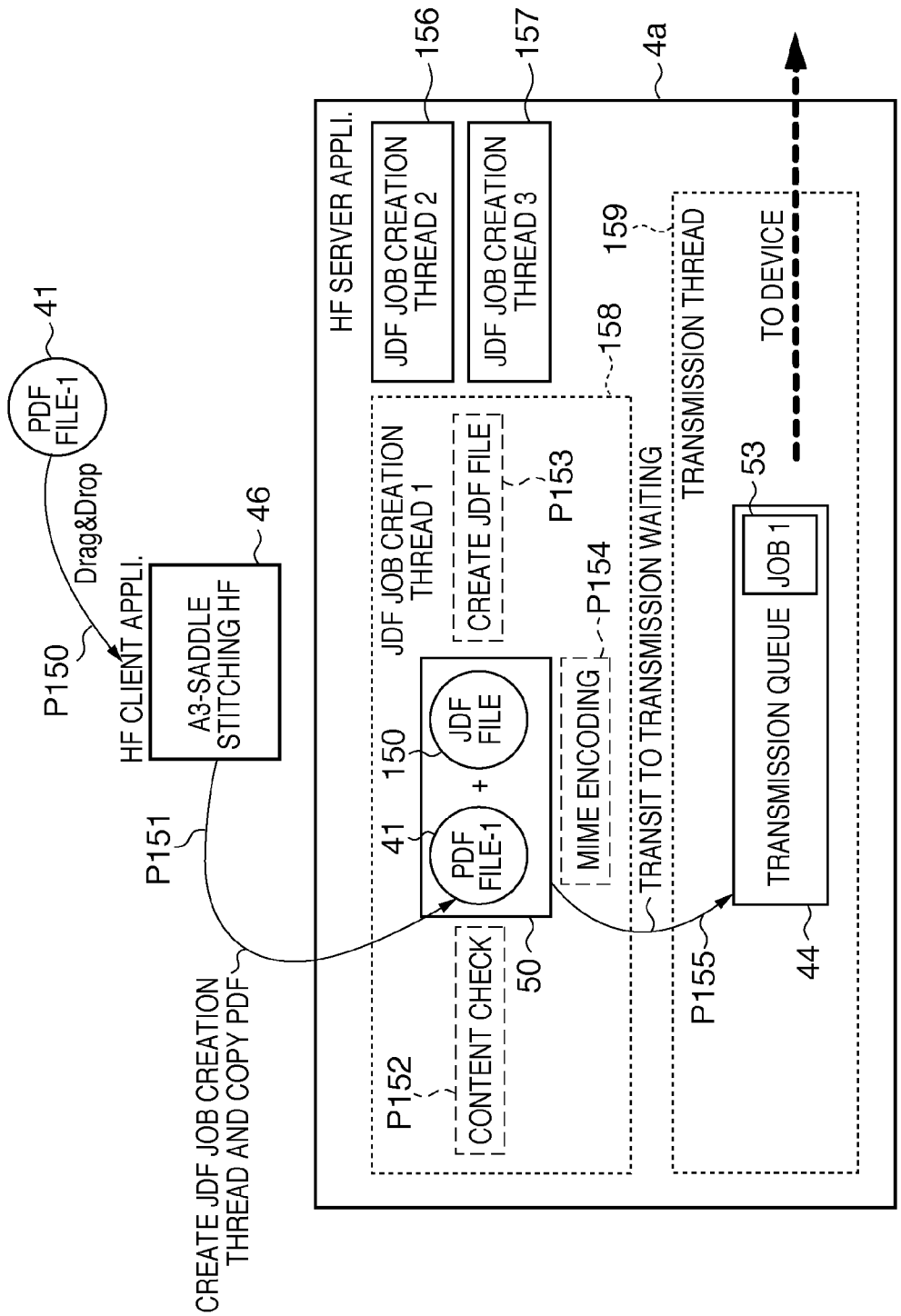
FIG. 30 is a view for explaining an example of processing of a conventional HF client PC and HF server PC.

FIG. 12 is a view showing the detailed processing sequence of the HF client appli. 46 and HF server appli. 4a according to the first embodiment, in correspondence with FIG. 30 of the related art. Note that change points from FIG. 30 will be mainly described below. The same reference numerals denote the same elements and processes as in FIG. 30.

When the user drags & drops a PDF file-1 41 onto the HF client appli. 46, the HF client appli. 46 receives an entry event of the PDF file-1 from the OS. Upon reception of this event, the HF client appli. 46 creates the following data. That is, the HF client appli. 46 creates, as order data, an HF client appli. name uniquely set in advance for each HF client appli., an entry file number which is incremented by +1 every time a file is entered to the HF client appli. 46, and a reception time of the event. This order data corresponds to the job management information shown in FIG. 8. The HF client appli. 46 creates JDF data as a print instruction to be appended to the entered PDF file-1. A process P160 indicates a process for embedding the order data in this JDF file 162. A process P161 indicates a process for transferring the created JDF file 162 and the entered PDF file-1 41 to the HF server appli. 4a of the HF server 20.

Then, the HF server appli. 4a creates a print job based on the transferred JDF file 162 and the entered PDF file-1 41, and holds the created print job in the print job storage area 105a (see FIG. 5). The HF server appli. 4a sorts the held print jobs in correspondence with respective entered HF client appli. names using the order data recorded in the JDF files. Also, the HF server appli. 4a sorts the print jobs using the entry file numbers as the order of entries as serial numbers for each HF client appli. name.

Since the JDF files describe the entry file numbers of the identical HF client appli. name as serial numbers, the PDF files having the identical HF client appli. name are arranged in the order of entries to the HF client appli. as a result of the aforementioned sorting, and are sent to the transmission queue 44. As a result, the transmission order of print jobs from the transmission queue 44 to a device (color MFP) matches the order of entries of the PDF files to the HF client appli.

Note that the aforementioned sorting may be done for each transfer of a print job to the transmission queue 44. Also, print job data from a transmission thread 159 which transmits data may be processed not to be transmitted when there is no next print job as a serial number in the transmission queue.

(Operation Example in Pod System)

Figure 13:
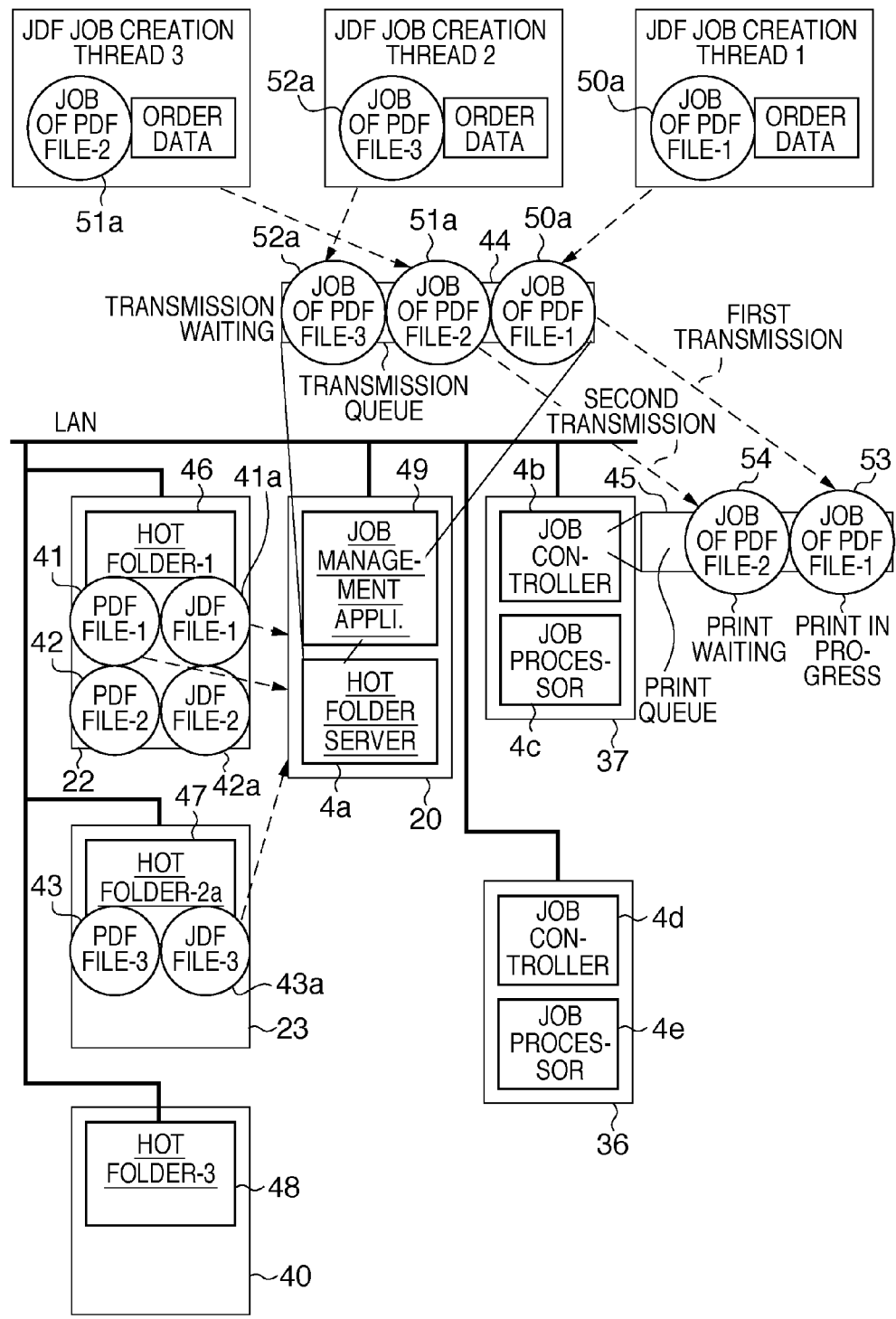
FIG. 13 is a view for explaining a processing example of the POD system according to the first embodiment.

FIG. 13 is a view for explaining an operation example in the POD system according to the processing shown in FIG. 12. Note that FIG. 13 shows the processing in the first embodiment when the transfer order of PDF files to the HF server appli. 4a is different from the order of entries of PDF files to the HF client appli. 46 and an HF client appli. 47, as described in the paragraphs of the problems according to FIG. 31. In this case, a hot folder-1, hot folder-2, and hot folder-3 as client applis. 46 to 48 are implemented by sharing folders of the HF server appli. 4a created on the PC 20 via a network. Note that the same reference numerals in FIG. 13 denote the same elements as in FIGS. 4, 29A, 29B, 31, and 32.

A situation in which a PDF file-1 41, PDF file-2 42, and PDF file-3 43 are entered into the HF client appli. 46 or 47 in the order named, but the transfer order to the HF server appli. 4a becomes that of the PDF file-1, PDF file-3, and PDF file-2 is the same as in FIG. 31.

Such reversal of the orders occurs for the following reason. For example, many processes are required from entries of the PDF files into the HF client applis. 46 and 47 until the corresponding print jobs are set in the transmission queue 44. Therefore, processing times required until the corresponding print jobs are set in the transmission queue 44 have differences depending on the sizes of the entered PDF files, the complexities and sizes of JDF files to be created, and an environment on the HF server PC 20. As a result, the order of print jobs set in the transmission queue 44 and print queue 45 is reversed from the order of entries of the PDF files.

In FIG. 13, a JDF file including order data corresponding to the PDF file entered by the HF client appli. 46 or 47 is created, and the PDF file and JDF file are transferred as a pair to the HF server appli. 4a, as described in FIG. 12. For example, a JDF file-1 41a, JDF file-2 42a, and JDF file-3 43a including created order data are appended to the PDF file-1 41, PDF file-2 42, and PDF file-3 43, and these PDF files are transferred to the HF server appli. 4a. In FIG. 13, reference numerals 50a to 52a respectively denote pairs of the PDF files and JDF files.

Therefore, after the pair of the PDF file-3 43 and JDF file-3 43a are transferred to a JDF job creation thread 2, the pair of the PDF file-2 42 and JDF file-2 42a may be transferred. Even in such case, the PDF files are sorted in the order of entries in the transmission queue 44.

A case will be assumed wherein the processing times required until corresponding jobs are set in the transmission queue 44 have differences due to the sizes of the entered PDF files, the complexities and sizes of the JDF files to be created, and an environment on the HF server PC 20. Even in this case, the order of the print jobs set in the transmission queue 44 and print queue 45 matches the order of entries of the PDF files by the processing according to the first embodiment. Furthermore, a case will be assumed wherein PDF files entered from different HF client applis. (different customers (print settings)) are mixed. Even in this case, since the PDF files are sorted based on HF client appli. names, print jobs corresponding to the different HF client applis. (different customers (print settings)), which are to be set in the transmission queue 44 and print queue 45, are prevented from being mixed.

(Display Example of HF Job List by Job Management Appli. of First Embodiment)

An example in which the transmission order of print jobs from the HF server appli. 4a is changed will be explained below using windows displayed on the job management appli. 49 with reference to FIGS. 14A to 14D. Note that a case in the same situation as in FIG. 13 will be explained except that job 4 is also included.

Referring to FIG. 14A, reference numeral 170 denotes a window on which the job management appli. 49 displays a status of a print job in the HF server appli. 4a. Reference numeral 171 denotes an HF name. Upon selection of the HF name 171, only a job which is being transmitted from the selected HF client appli. name of print jobs transferred to the HF server appli. 4a is displayed. In this example, an "A3-saddle stitching HF" 172 is selected as the HF name, and only a print job created based on a PDF file entered to the "A3-saddle stitching HF" is displayed.

Assume that the HF server appli. 4a automatically sorts print jobs based on the HF name and the order of entries. Alternatively, print jobs may be sorted in response to selection of the HF name as a trigger.

Reference numeral 174 denotes a print job which is held in the HF server appli. 4a and has the selected HF client appli. name. In FIG. 14A, only one print job 174 is held. Upon selection of a "My Job" 173, all print jobs held in the HF server appli. 4a are displayed irrespective of the HF names.

FIG. 14B shows a state in which one print job, which is held in the HF server appli. 4a and is created based on a PDF file entered to the "A3-saddle stitching HF", is added. Reference numeral 180 denotes a print job created based on a third PDF file entered to the "A3-saddle stitching HF". In this example, the number of the order of entries is appended to a job name for the sake of easy understanding. That is, FIG. 14B shows that A-company job 3 corresponding to a third PDF file entered to the "A3-saddle stitching HF" is transferred to the HF server appli. 4a after A-company job 1 corresponding to a first PDF file entered to the "A3-saddle stitching HF", or A-company job 3 transits to the transmission queue.

FIG. 14C shows a state in which two print jobs, which are created based on PDF files entered to the "A3-saddle stitching HF", are further added to the HF server appli. 4a. Note that reference numeral 190 denotes a print job created based on a second PDF file entered to the "A3-saddle stitching HF"; and 200, a print job created based on a fourth PDF file entered to the "A3-saddle stitching HF".

Figure 14D:
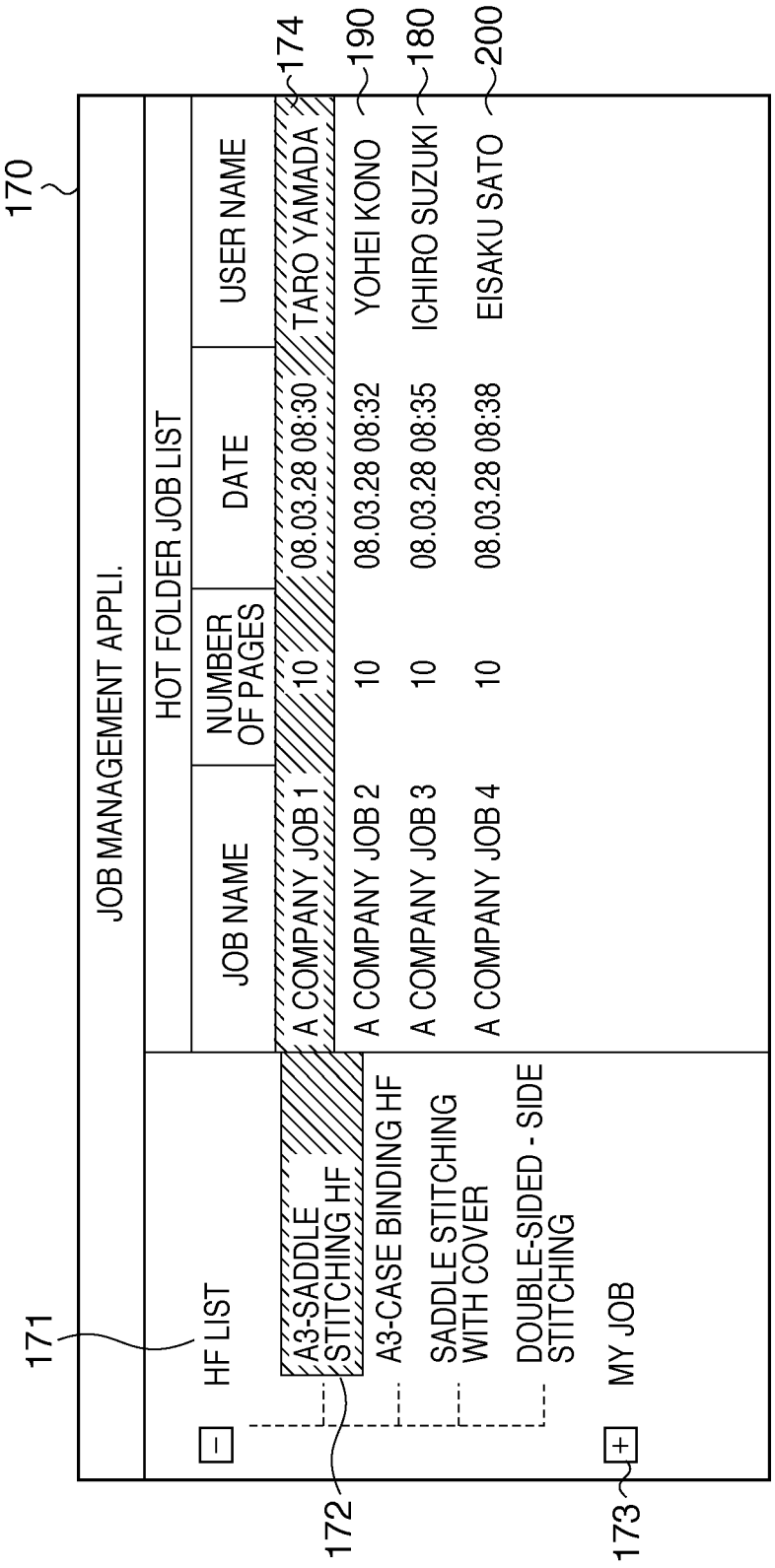
FIG. 14D is a view showing an example in which the order of print jobs is changed on the job management appli. according to the first embodiment.

FIG. 14D shows a sorting result of the print jobs of the HF server appli. 4a for each HF name to which PDF files are entered and based on the order of entries to that HF client appli. The order of the print job (A-company job 2) 190 of the second PDF file entered to the "A3-saddle stitching HF" and the print job (A-company job 3) 180 of the third PDF file entered to the "A3-saddle stitching HF" is changed to the order of entries. The HF server appli. 4a changes the order using the HF client appli. name and serial entry file numbers recorded in the JDF files.

<Processing Procedure Example of First Embodiment>

Figure 15:
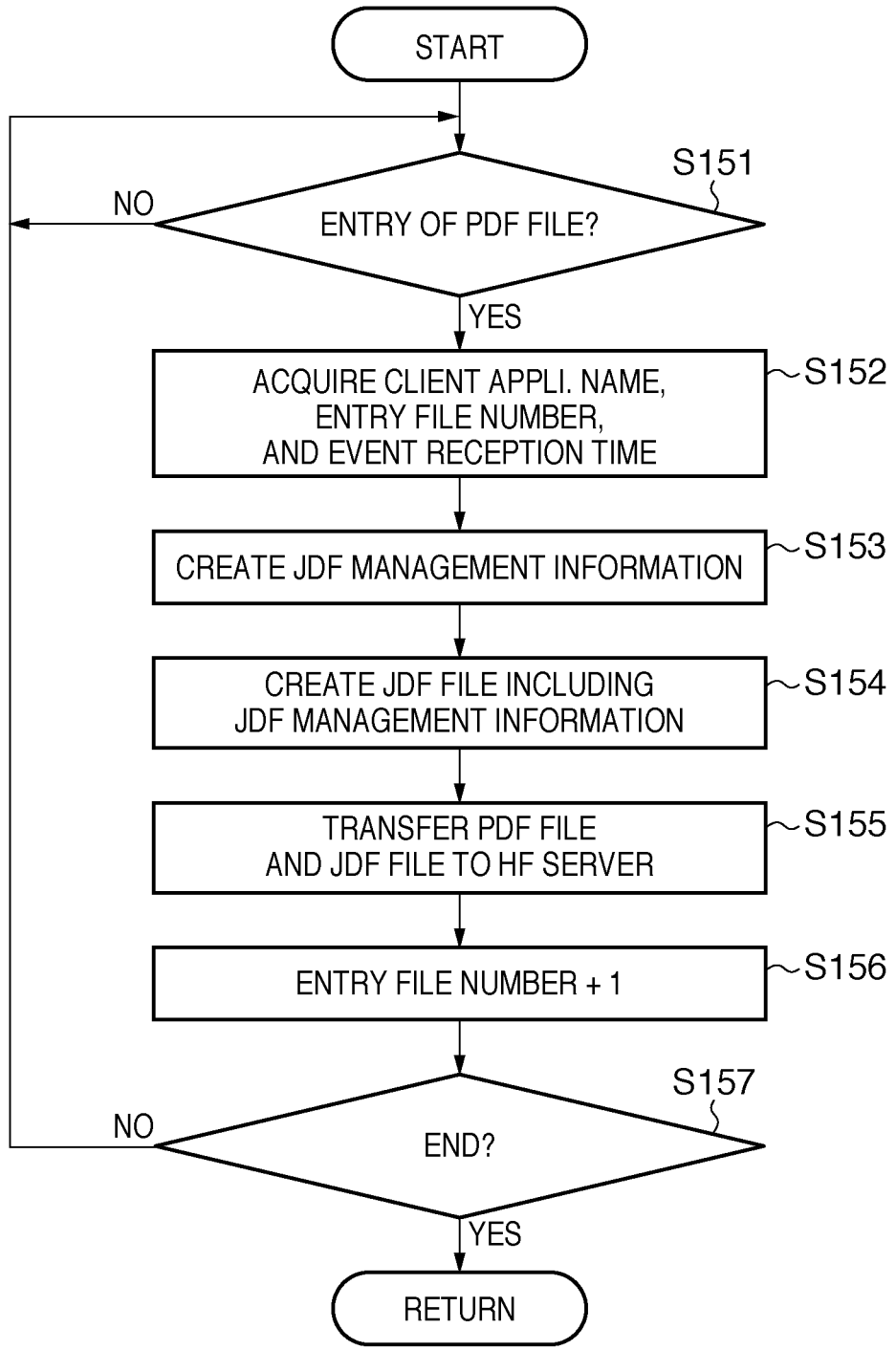
FIG. 15 is a flowchart showing an example of the processing procedures in the HF client PC according to the first embodiment.
Figure 16:
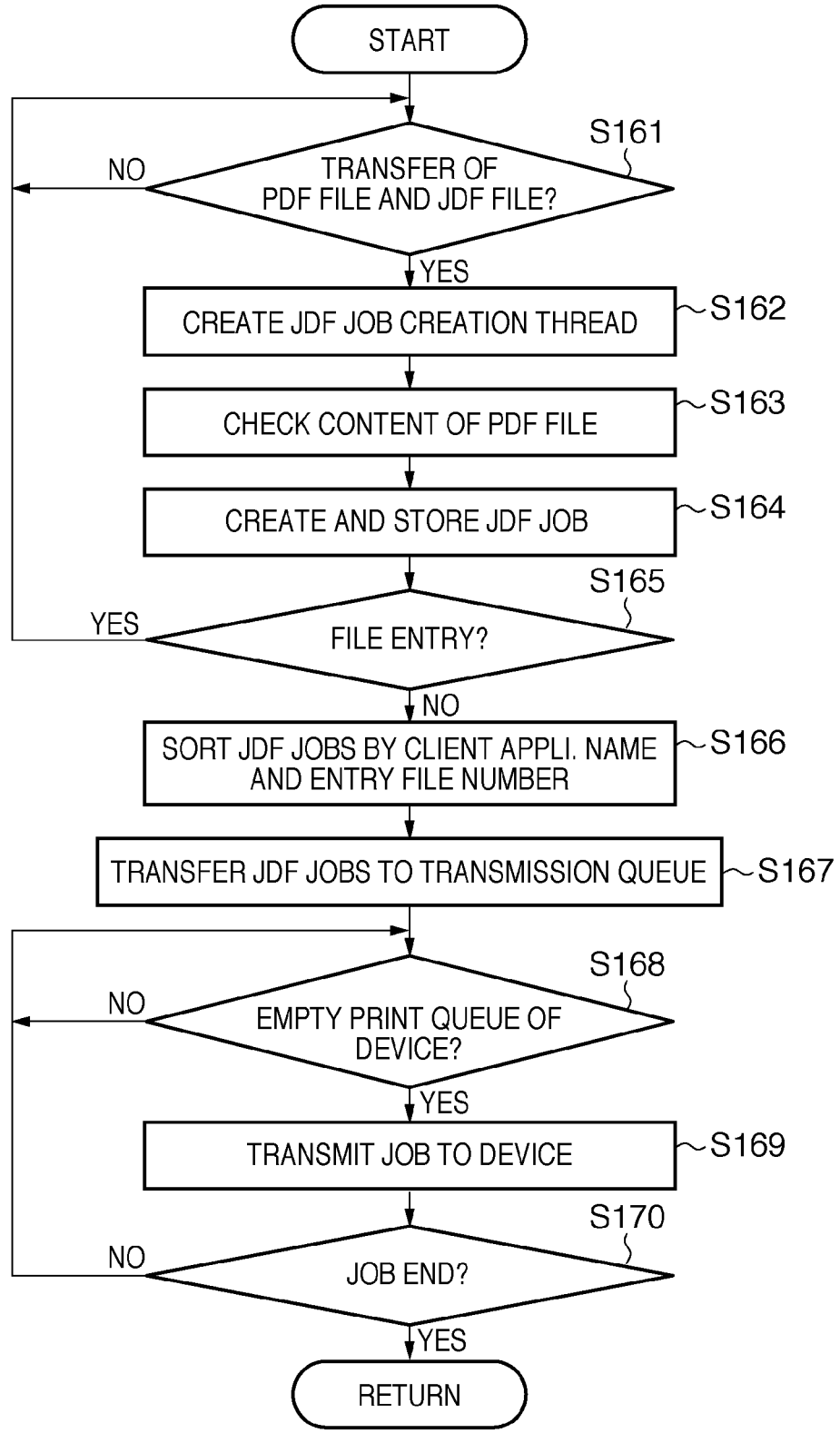
FIG. 16 is a flowchart showing an example of the processing procedures in the HF server PC according to the first embodiment.

FIGS. 15 and 16 are flowcharts showing examples of the processing procedures of the HF client PC and HF server PC, which are required to implement the processing of the first embodiment. Note that FIGS. 15 and 16 show only some procedures as characteristic features of the first embodiment. These flowcharts are executed by the CPU 101 in FIG. 5.

FIG. 15 is a flowchart showing an example of the processing procedures of the HF client PC of the first embodiment.

In step S151, the CPU 101 waits for an entry of a PDF file to the HF client appli. Upon detection of an entry of a PDF file, the process advances to step S152, and the CPU 101 acquires a client appli. name, entry file number, and event reception time. The entry file number is acquired by sending a request from the HF client appli. to the HF server appli. 4a. The CPU 101 creates JDF management information used as order data based on the acquired information in step S153.

In step S154, the CPU 101 creates a JDF file including the JDF management information created in step S153. In step S155, the CPU 101 transfers the JDF file including the JDF management information and the entered PDF file as a pair to the HF server appli. of the HF server.

In step S156, the CPU 101 increments an entry file number to the identical client appli. name by 1. The process then returns to step S151, and the CPU 101 waits for an entry of the next PDF file. If an HF client appli. end instruction is received in step S157, the CPU 101 ends the processing.

FIG. 16 is a flowchart showing an example of the processing procedures of the HF server PC of the first embodiment.

In step S161, the CPU 101 waits for transfer of a pair of a PDF file and JDF file from the HF client appli. PC. Upon reception of the transferred pair of the PDF file and JDF file, the process advances to step S162, and the CPU 101 creates a JDF job creation thread. The CPU 101 executes the content check processing of the transferred PDF file in step S163. In step S164, the CPU 101 creates a JDF job (print job) including the PDF file and JDF file and stores the created JDF job. Upon detection of an entry of another PDF file in step S165, the process returns to step S161, and the CPU 101 waits for transfer of a pair of a PDF file and JDF file.

If there is no entry of another PDF file, the CPU 101 sorts print jobs based on the client appli. name and entry file numbers as order data of the JDF files in step S166. The CPU 101 transfers the print jobs which are sorted in the order of entries to the HF client appli. to the transmission queue. Note that the CPU 101 may sort print jobs to change their order every time they transit to the transmission queue. Such processing is included in print job changing processing.

The CPU 101 checks in step S168 if a print queue of a print destination device is empty. If the print queue is not empty, the CPU 101 waits until the previous print processing is completed and the print queue becomes empty. If the print queue is empty, the CPU 101 transmits the next print job to the print destination device in step S169. The CPU 101 checks in step S170 if all print jobs are transmitted. If print jobs to be transmitted still remain, the process returns to step S168, and the CPU 101 transmits the remaining print job to the device. After all the print jobs are transmitted, the CPU 101 ends the processing.

Note that the processing procedures required to implement the processing of the first embodiment are not limited to FIGS. 15 and 16.

Second Embodiment

FIGS. 17 to 23 show the second embodiment of the present invention. The second embodiment will explain an example in which when an HF is created, and the relationship between HFs to be continuously executed at the time of execution of large-quantity print operations is known, setting information that allows continuous printing by a color MFP is displayed for an operator.

(Precondition Example Upon Carrying Out this Embodiment)

Figure 17:
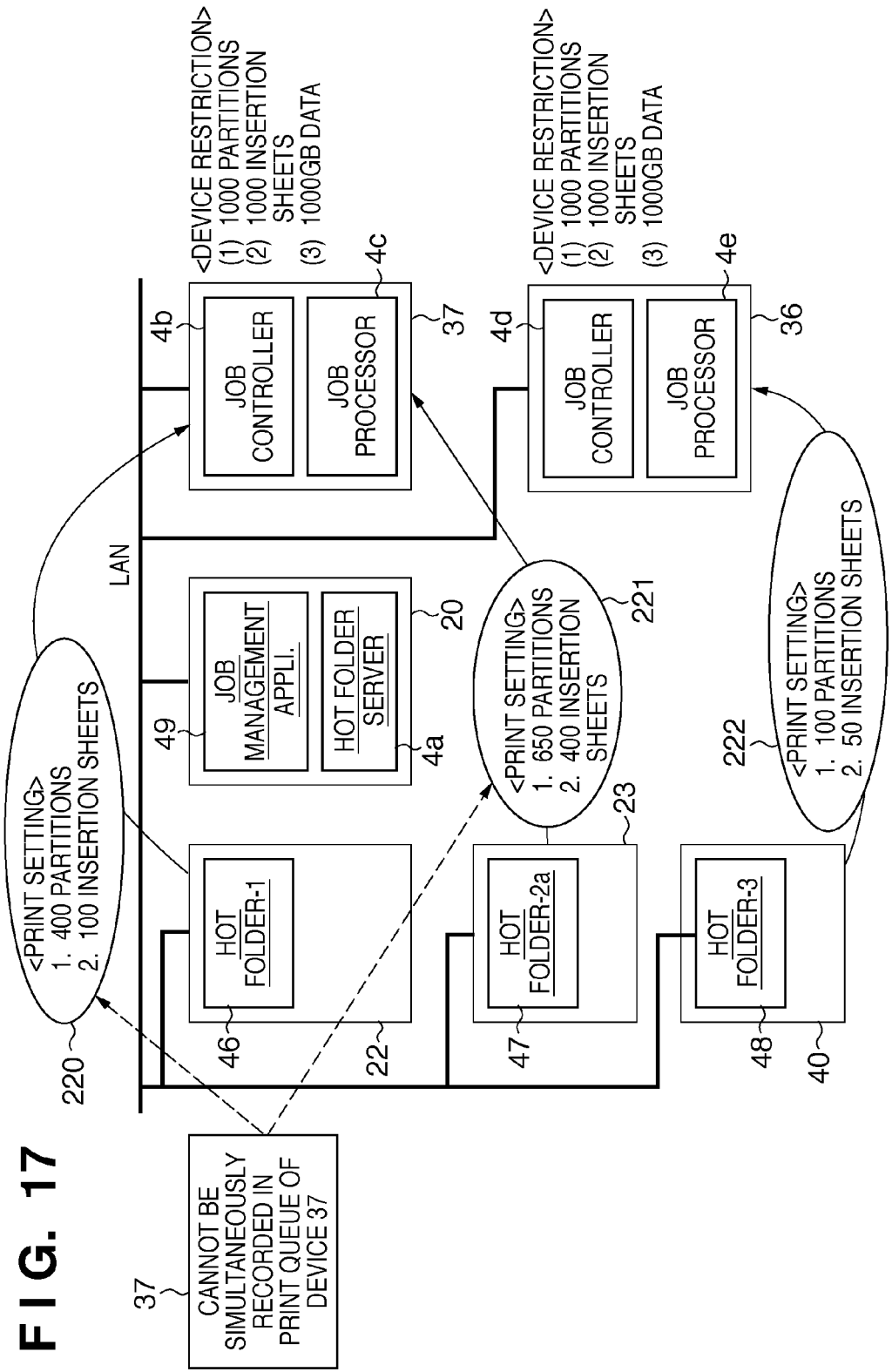
FIG. 17 is a view for explaining a problem example in a POD system according to the second embodiment.

FIG. 17 shows an example in which when HF client applis. 46 and 47 continuously execute print processing using a color MFP 37, a time zone in which no print processing is executed is made since the next job cannot be transmitted in advance to a print queue of the color MFP. Note that the same reference numerals in FIG. 17 denote the same elements as in FIG. 4.

In this example, assume that a printer of the color MFP 37 can simultaneously record in a print queue (1) up to 1000 partitions as an exception setting for respective pages, (2) up to 1000 positions as an insertion sheet setting, and (3) up to 1000 GB as a DISK capacity. A print setting 220 of the HF client appli. 46 includes 400 partitions, and an insertion sheet setting of 100 positions. A print setting 221 of the HF client appli. 47 includes 650 partitions and an insertion sheet setting of 400 positions. A print setting 222 of an HF client appli. 48 includes 100 partitions and an insertion sheet setting of 50 positions.

In this case, after the HF client appli. 46 transmits a succeeding print job to the color MFP 37, the HF client appli. 47 attempts to transmit a print job to the color MFP 37 before completion of the print job of the HF client appli. 46. Then, since 400+650=1050, that is, the upper limit of the number of partitions to be set is exceeded, the next print job cannot be transmitted before completion of print processing.

(Transmission Example of Print Job of Second Embodiment)

Figure 18:
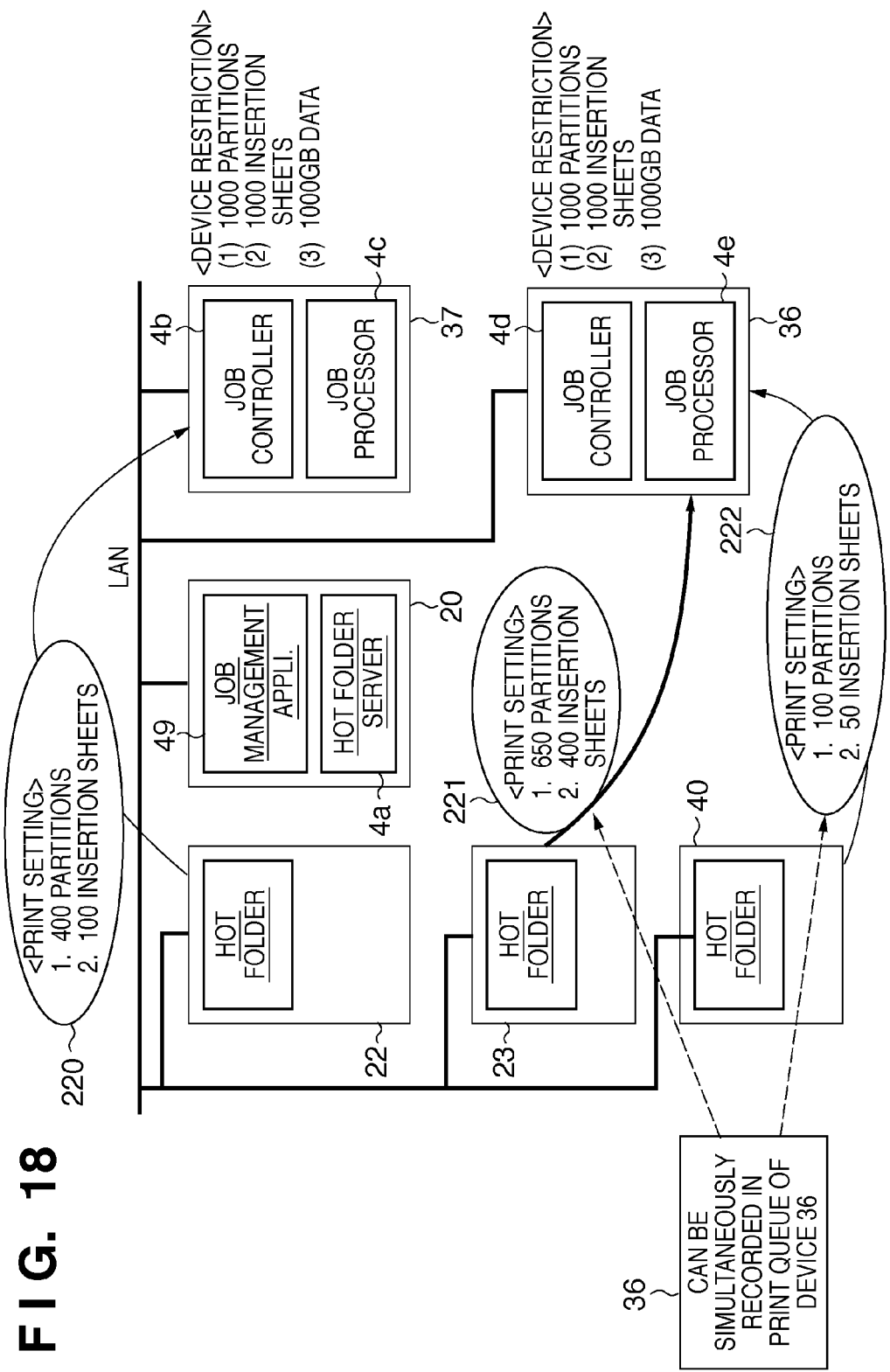
FIG. 18 is a view for explaining a processing example in the POD system according to the second embodiment.

FIG. 18 shows a processing example which allows continuous print processing using color MFPs when a color MFP as a print destination is changed upon creating the HF client appli. 47 that enters a succeeding print job.

After the HF client appli. 47 displays HF setting upper limit values, an operator changes a color MFP as a print destination, thus preventing a scheduled time period of operations from being consequently exceeded since continuous print processing is disabled at the time of execution of print operations.

In FIG. 18, an output destination of the HF client appli. 47 is changed from the color MFP 37 to the color MFP 36. An HF that uses the color MFP 36 is the HF client appli. 48 alone, and both the number of partitions and the number of insertion sheets fall within the upper limit ranges of the color MFP 36.

Processing of the second embodiment will be described in detail below.

Figure 19A:
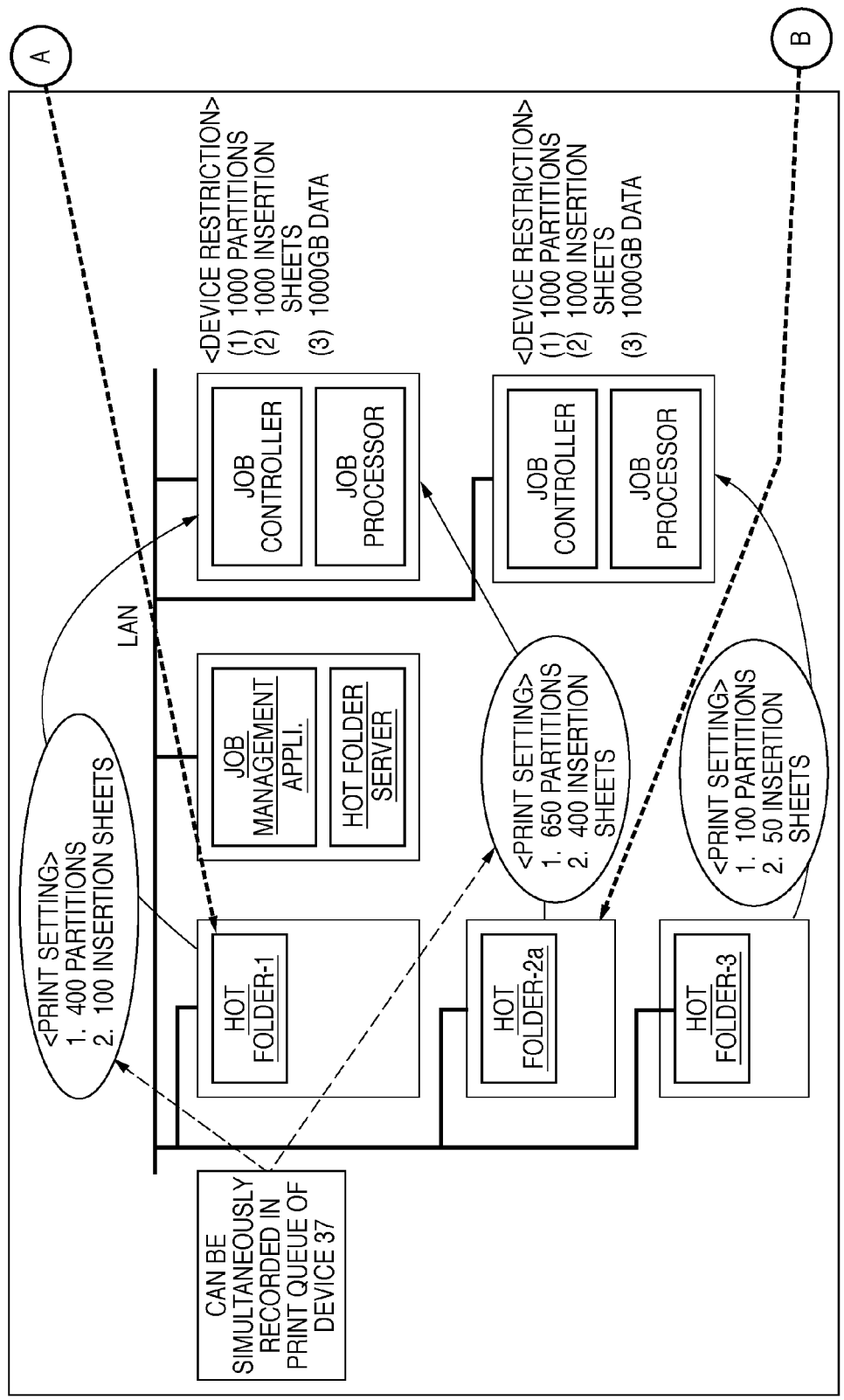
Figure 19B:
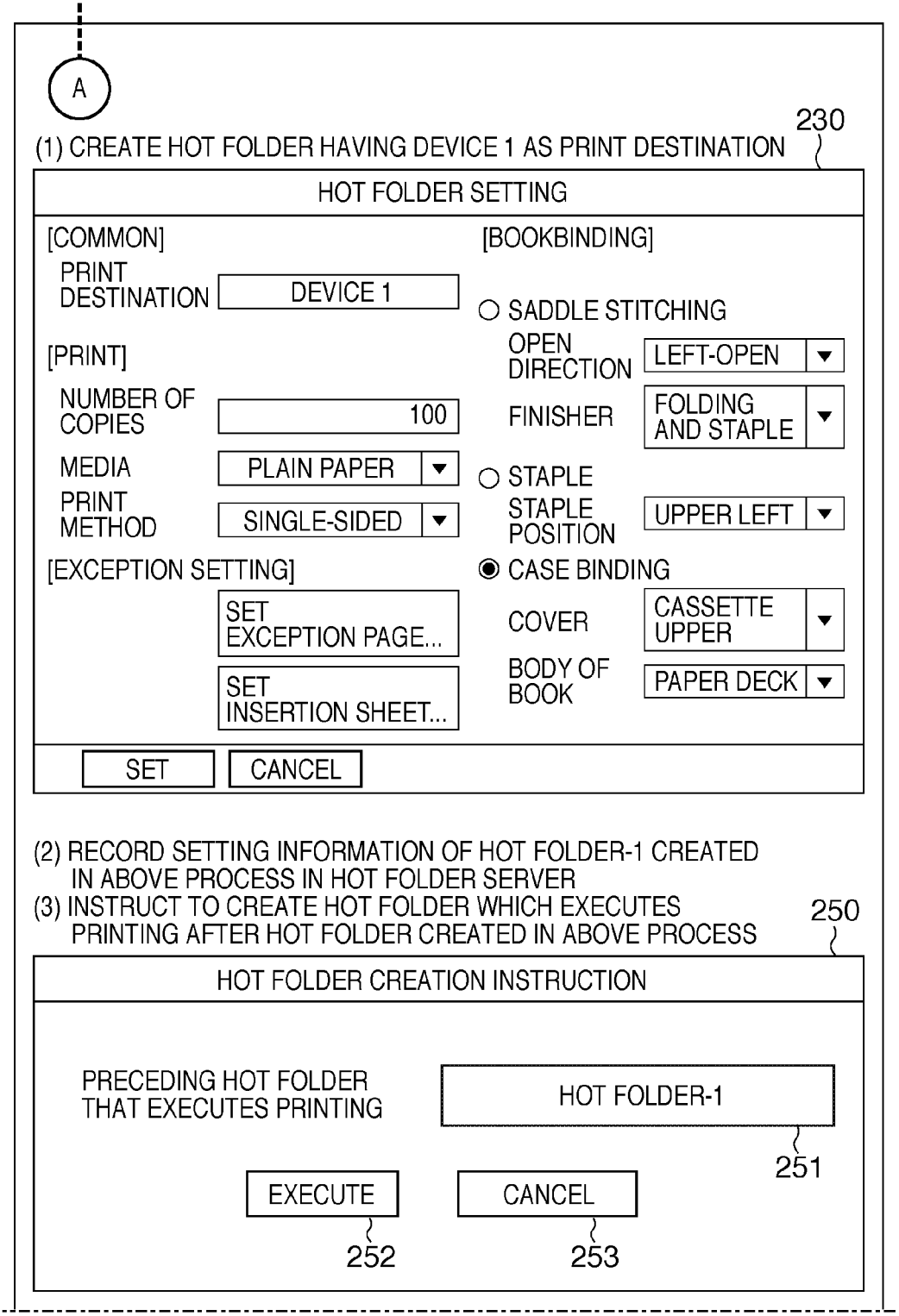

FIGS. 19A to 19C explain an example of processing in which after the HF client appli. 46 is created, the HF client appli. 47, which is to undergo print execution processing after the HF client appli. 46, begins to be created.

Referring to FIG. 19B, reference numeral 230 denotes a print setting window (details of which are shown in FIG. 20 to be described later). The operator selects a setting button on the print setting window 230 to create the HF client appli. 46. After that, the operator instructs to create an HF using an input unit such as a keyboard. Then, an HF creation instruction window 250 is displayed, and the operator instructs an HF name to be executed as a preceding HF at the time of execution of operations. If the operator does not instruct any name, subsequent processing is skipped as no inputs. Reference numeral 251 denotes a field used to input an HF name to be executed as a preceding HF. When the operator inputs an HF name in the input field 251, and presses an execution button 252, an HF print setting window 240 and an upper limit value dialog 254 that displays upper limit values of currently available settings are displayed. When the operator presses a cancel button 253, HF creation is canceled. The contents of the HF upper limit value dialog 254 are calculated based on the print setting information of the HF client appli. 46 created on the print setting window 230. With the setting on the print setting window 230, the HF client appli. 46 consumes settings of 400 partitions and 100 insertion sheets per job. Therefore, the remaining resources of the color MFP 37, which can be set, are "the number of partitions: 400, the number of setting positions of insertion sheets: 900 positions".

The operator makes print settings on the print setting window 240 within the range of the remaining MFP resources displayed on the upper limit value dialog 254. Then, the print processing of PDF files of the identical client appli., which are entered to the HF client applis. 46 and 47, can be continuously executed.

Also, the remaining resources of the MFP such as the number of partitions and the number of positions of insertion sheets that can be set can be re-calculated and displayed in real time every time the settings are made on the print setting window 240. As a result, the operator can make print settings on the print setting window 240 based on information re-displayed in real time.

FIG. 20 is a view showing an example of the print setting window 230 of the HF client appli. 46 in FIG. 19B.

Referring to FIG. 20, reference numeral 230 denotes an HF print setting window; and 231, a field used to designate a transmission destination device name of a print job. Reference numeral 232 denotes a field used to set the number of copies to be printed; 233, a field used to designate a media type used in printing; and 234, a field used to designate single- or double-sided printing as a print method. Reference numeral 235 denotes an exception page setting button used to change a print setting for each page; and 236, an insertion sheet setting button used to designate the number of a page where a sheet is to be inserted.

Reference numeral 237 denotes a field used to designate "left-open" or "right-open" at the time of designation of saddle stitching; and 238, a field used to designate whether to execute both or neither of folding and stable. Reference numeral 239 denotes a field used to designate a staple position upon execution of staple from "upper left", "lower left", and "left center". Reference numerals 23a and 23b denote fields used to designate sources that feed a document of a cover and those of a body of book upon execution of case binding.

Based on the settings of this example, 400 copies are printed, a sheet is inserted every time one copy is printed, and the whole print setting requires 400 partitions. Therefore, the whole print job consumes settings of 400 partitions and 100 insertion sheets.

FIG. 21 is an enlarged view showing an intermediate setting state of the print setting window 240 of the HF client appli. 47 in FIG. 19C.

Figure 22:
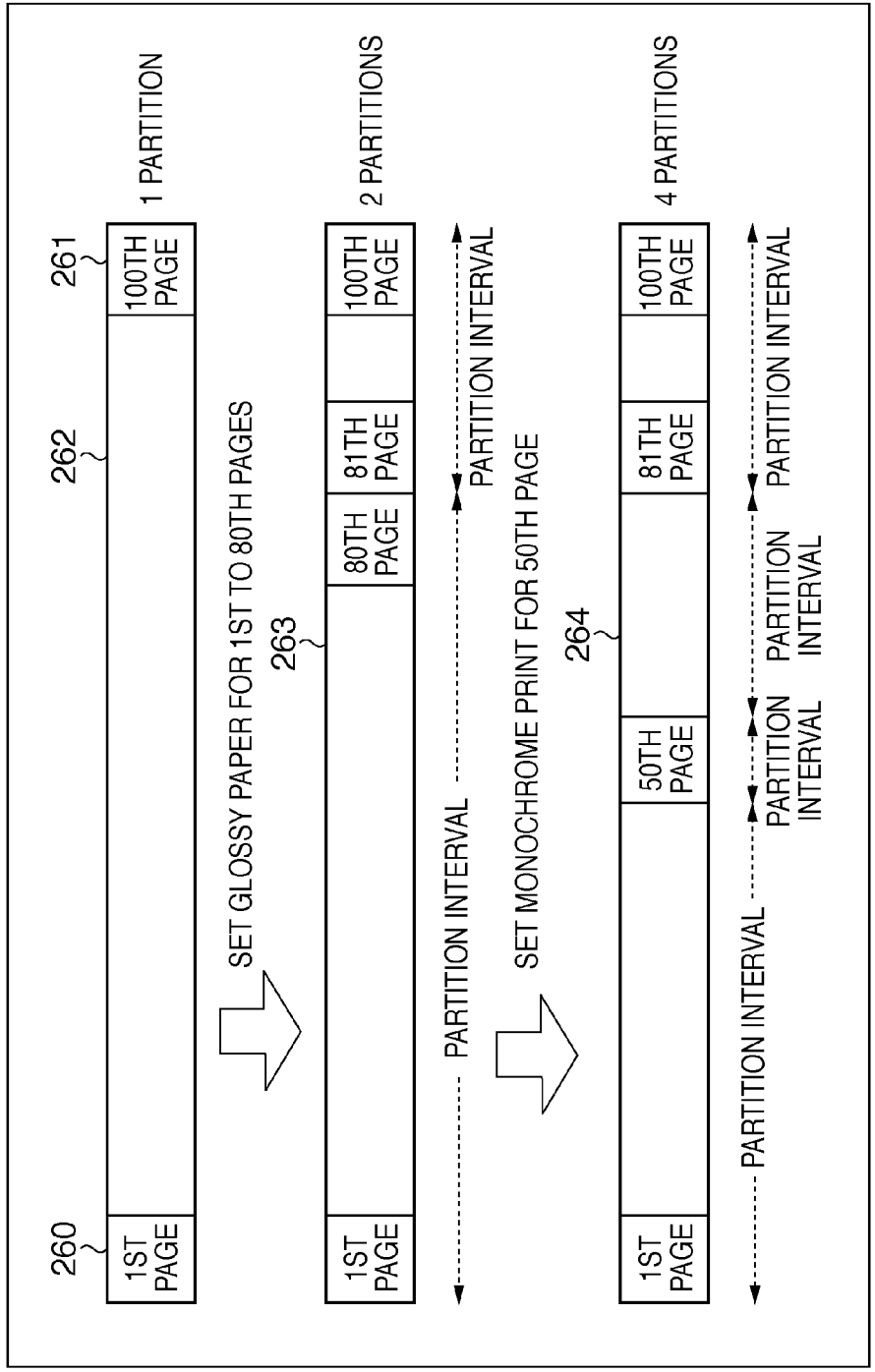
FIG. 22 is a view for explaining an example of partition settings according to the second embodiment.

FIG. 22 is a view for explaining a count method of the number of partitions to be given as the above explanation.

FIG. 22 will explain print settings of a document including a total of 100 pages and a method of calculating the number of partitions. Reference numeral 262 denotes a state in which no exception setting is made for the total of 100 page, and the overall document is expressed by one partition. Reference numeral 260 denotes the first page; and 261, the 100th page. In this state, use of glossy paper is designated for the first to 80th pages, as denoted by reference numeral 263. The settings are divided into two partitions, that is, that from the first to 80th pages, and that from 81st to 100th pages. Reference numeral 264 denotes a case in which a rendering method of only the 50th page is changed to monochrome printing. In this case, the settings are divided into four partitions, that is, that from the first to 49th pages, that for the 50th page, that from the 51st to 80th pages, and that from the 81st to 100th pages.

As described above, exception settings can be made for respective pages. When the exception settings are made, the number of partitions to be processed by the print setting information increases to be equal to or larger than the number of exception settings.

<Processing Procedure Example of PC of Second Embodiment>

Figure 23:
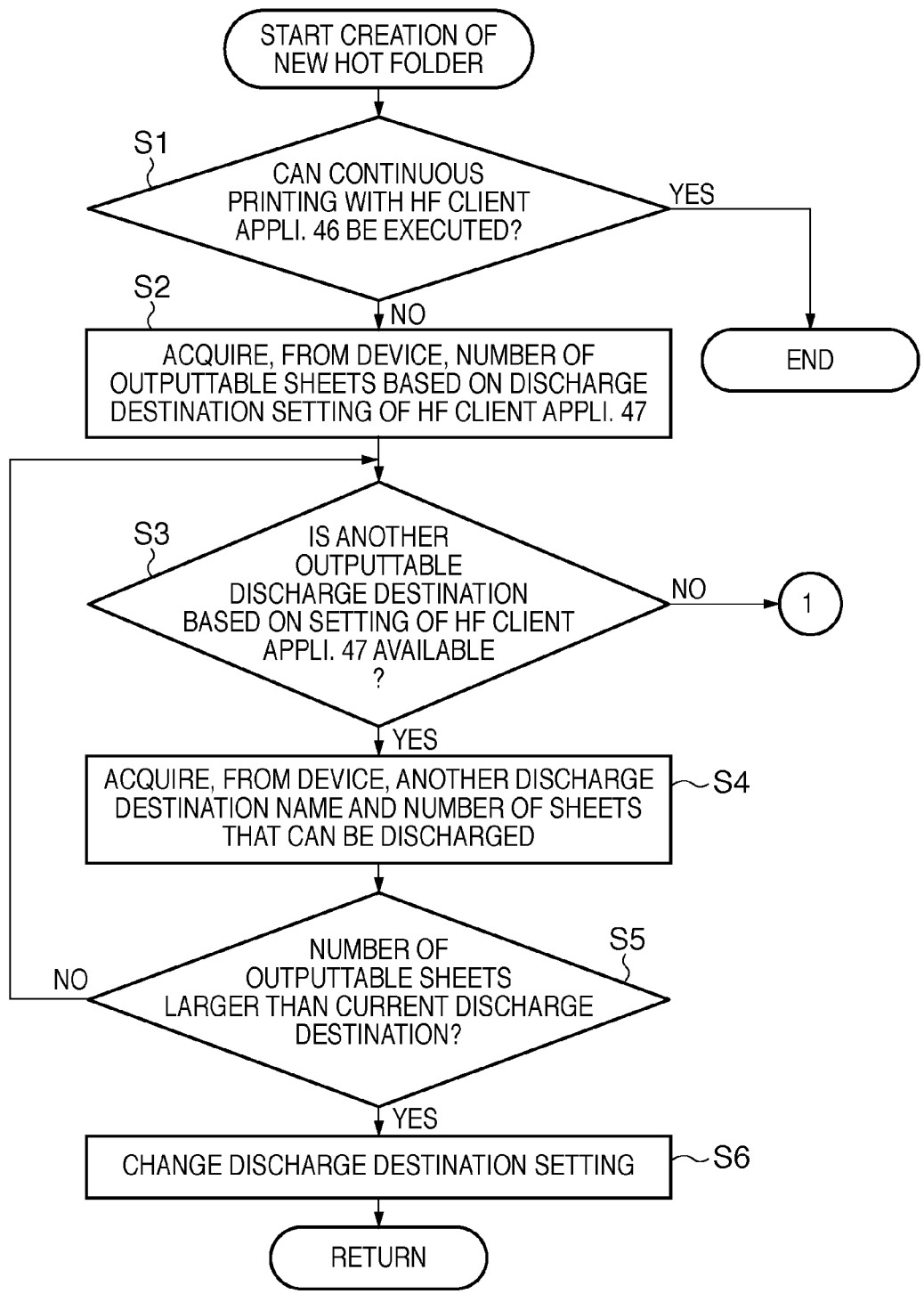
FIG. 23 is a flowchart showing an example of the processing procedures according to the second embodiment.

FIG. 23 is a flowchart showing an example of the processing procedures of the HF client PC and HF server PC of the second embodiment. This flowchart is executed by the CPU 101 shown in FIG. 5.

Assume that the operator instructs the setting button on the HF setting window 240 shown in FIG. 21. Upon instructing to create the HF client appli. 47, the CPU 101 checks in step S1 if continuous print processing with the HF client appli. 46 can be executed. If the continuous print processing can be executed, this processing ends.

If it is determined that the continuous print processing cannot be executed, the process advances to step S2. Then, the CPU 101 acquires a discharge destination (color MFP 37) designated by the HF client appli. 47, and acquires the remaining number of sheets that can be output from the color MFP 37. The process advances to step S3, and the CPU 101 checks if another color MFP as a discharge destination that can discharge sheets is available in addition to the designated color MFP 37. If no discharge destination that can discharge sheets is available, the process advances to the flowchart of the third embodiment shown in FIG. 25.

If another discharge destination that can discharge sheets (color MFP 36) is available, the process advances to step S4, and the CPU 101 acquires that discharge destination name and the number of sheets that can be discharged from the discharge destination (color MFP 36). In step S5, the CPU 101 compares the number of sheets that can be discharged of the new discharge destination acquired in step S4 with the number of sheets that can be discharged of the current discharge destination setting recorded in step S2. The CPU 101 then checks if the number of sheets that can be output by the other discharge destination acquired in step S4 is larger than that by the current discharge destination. If the number of sheets that can be output by the other discharge destination is smaller than that by the current discharge destination, the process returns to step S3 without changing any settings. If the number of sheets that can be discharged by the other discharge destination is larger than that by the current discharge destination, the process advances to step S6, and the CPU 101 changes the discharge destination setting to the output destination acquired in step S4. This processing corresponds to print destination changing processing included in the print job changing processing.

Note that the discharge destination changing processing of the second embodiment is desirably implemented as a service from the HF server PC to the HF client PC when the HF client PC and HF server PC are independent.

Third Embodiment

A processing example of the third embodiment will be described below with reference to FIGS. 24 to 28. The third embodiment will explain an example in which when an HF is created, and the relationship between HFs to be continuously executed at the time of execution of large-quantity print operations is known, the print settings of the succeeding HF to be created are automatically divided so as to allow a color MFP to execute continuous print processing.

(First Transmission Example of Print Job of Third Embodiment)

Figure 24:
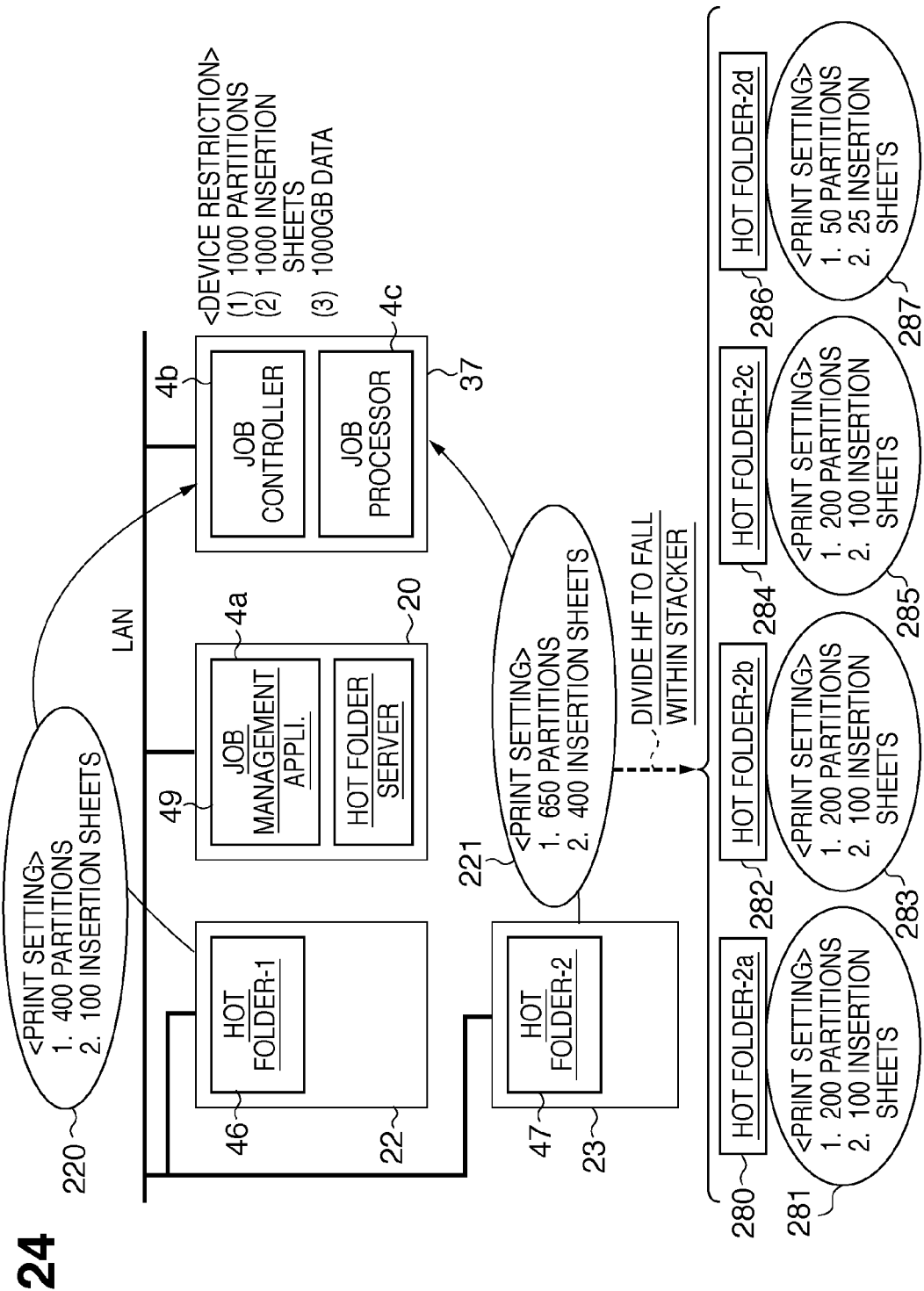
FIG. 24 is a view for explaining a first processing example of a POD system according to the third embodiment.

FIG. 24 shows an example in which the example in which the continuous print processing of HF client applis. 46 and 47 cannot be executed, as shown in FIG. 17, is solved by a method different from the second embodiment. That is, FIG. 24 shows an example in which upon creating the HF client appli. 47 which enters a succeeding print job, print settings are automatically divided to fall within the restriction ranges of the color MFP 37 and to execute continuous processing using the same drive. Note that the same reference numerals in FIG. 24 denote the same elements as in FIGS. 4 and 17.

As has been described above with reference to FIG. 17, with the print setting 221 of the HF client appli. 47, print jobs of the HF client applis. 46 and 47 cannot be simultaneously registered in a print queue of the color MFP 37. This is because the two print jobs require a total of 1050 partitions, which exceed the limit value (1000 partitions) of the resources of the color MFP 37.

Therefore, in FIG. 24, upon creating the HF client appli. 47, the print setting of the HF client appli. 47 is automatically divided so as to allow the operator to execute easy processing. This embodiment exemplifies a case in which a stacker is connected to the color MFP 37, and an HF is divided for each number of documents that can be output to the stacker. For example, when 1000 sheets can be output to the stacker, the print setting of the HF client appli. 47 is divided so that the number of output sheets becomes equal to or smaller than 1000. In this embodiment, upon instructing to create the HF client appli. 47, four HFs, that is, an HF-2a 280, HF-2b 282, HF-2c 284, and HF-2d 286 are created.

The current print setting includes settings of 200 partitions and 100 positions of insertion sheets, as denoted by reference numeral 281, and the total number of output sheets with an HF-1 becomes 1000. The print settings of the HF-2b and HF-2c are the same as that of the HF-2a, and that of the HF-2d includes settings of the remaining 50 partitions and 25 insertion sheets.

Note that this embodiment determines a division unit based on the number of documents to be discharged. However, when a shift discharge mode is set for each number-of-copy unit, this number-of-copy setting may be used. When insertion of slip sheets is set in correspondence with respective number-of-copy units, this number-of-copy setting may be used. Also, values obtained by equally dividing the restriction values of a device may be used.

(Procedure Example of First Transmission Example of Third Embodiment)

Figure 25:
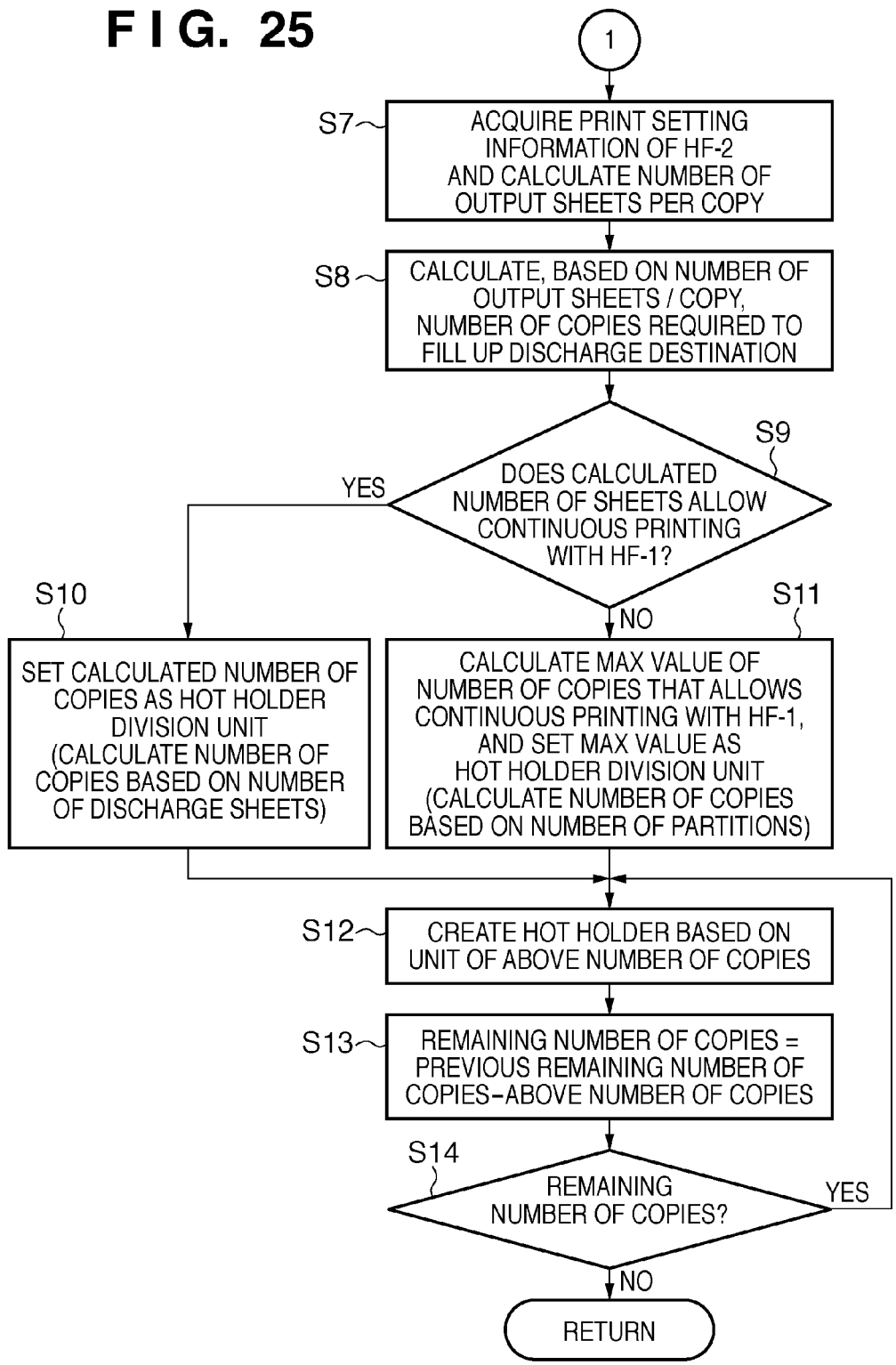
FIG. 25 is a flowchart for explaining an example of the processing procedures that implement the processing shown in FIG. 24.

FIG. 25 is a flowchart for explaining an example of the procedures of the first transmission example (FIG. 24) of the third embodiment. Note that the flowchart of FIG. 25 is shown as the sequel from the processing shown in FIG. 23, but it may be independent processing. In case of the sequel from FIG. 23, if it is determined in step S3 based on the setting of the HF client appli. 47 that there is no discharge destination that can output sheets, the process advances to the processing in FIG. 25.

In step S7, the CPU 101 acquires the print setting information 221 set for the HF-2 of the HF client appli. 47, and calculates the number of output sheets required to be printed per copy. The process advances to step S8, and the CPU 101 calculates, based on the number of sheets to be printed out per copy acquired in step S7, the number of copies to be printed required to fill up a discharge destination such as a stacker.

The process advances to step S9, and the CPU 101 checks if a print job which is to be created in correspondence with the number of copies acquired in step S8 can be set in the print queue of the color MFP 37 simultaneously with a print job of the HF client appli. 46.

If the two print jobs can be simultaneously set in the print queue of the color MFP 37, the process advances to step S10, and the CPU 101 sets the number of copies to be output acquired in step S8 as a divisional creation unit of a print job by the HF client appli. 47. If it is determined in step S9 that the two print jobs cannot be simultaneously set in the print queue of the color MFP 37, the process advances to step S11, and the CPU 101 calculates a MAX value of the number of copies that allows continuous print processing with the setting of the HF client appli. 46. Then, the CPU 101 sets that MAX value as a divisional creation unit of a print job of the HF client appli. 47. The process advances to step S12, and the CPU 101 creates one HF based on the number of copies to be output acquired by the processes so far. In step S13, the CPU 101 calculates the remaining number of copies of the total number of copies to be created by the HF client appli. 47. The CPU 101 checks in step S14 if a printable HF is created. If the remaining number of copies still remains, the process returns to step S12; otherwise, the processing ends. The HF-2a 280, HF-2b 282, HF-2c 284, and HF-2d 286 in FIG. 24 correspond to the division results of this example. This processing is included in the print job changing processing.

(Second Transmission Example of Print Job of Third Embodiment)

Figure 26:
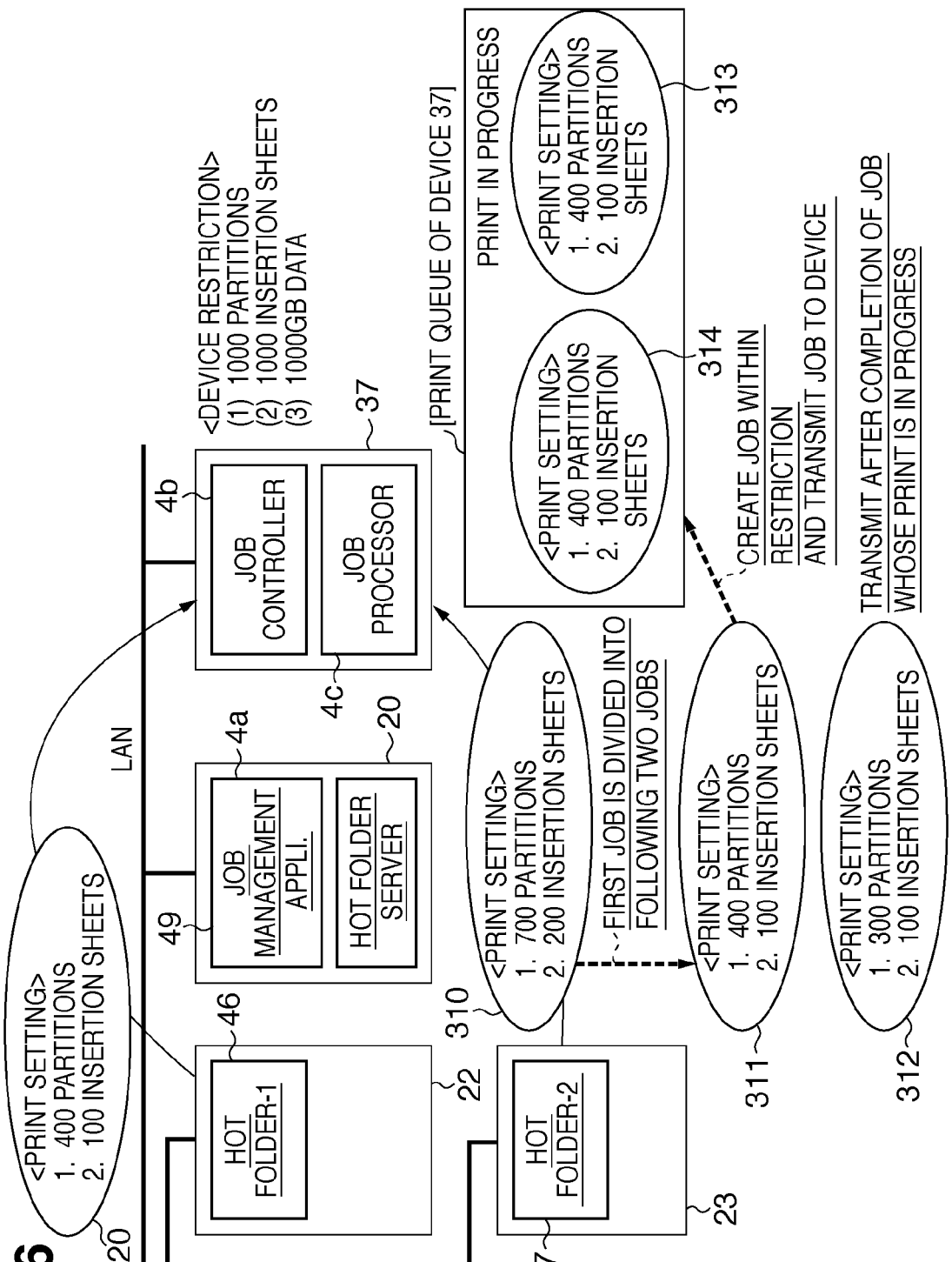
FIG. 26 is a view for explaining a second processing example of the POD system according to the third embodiment.
Figure 27:
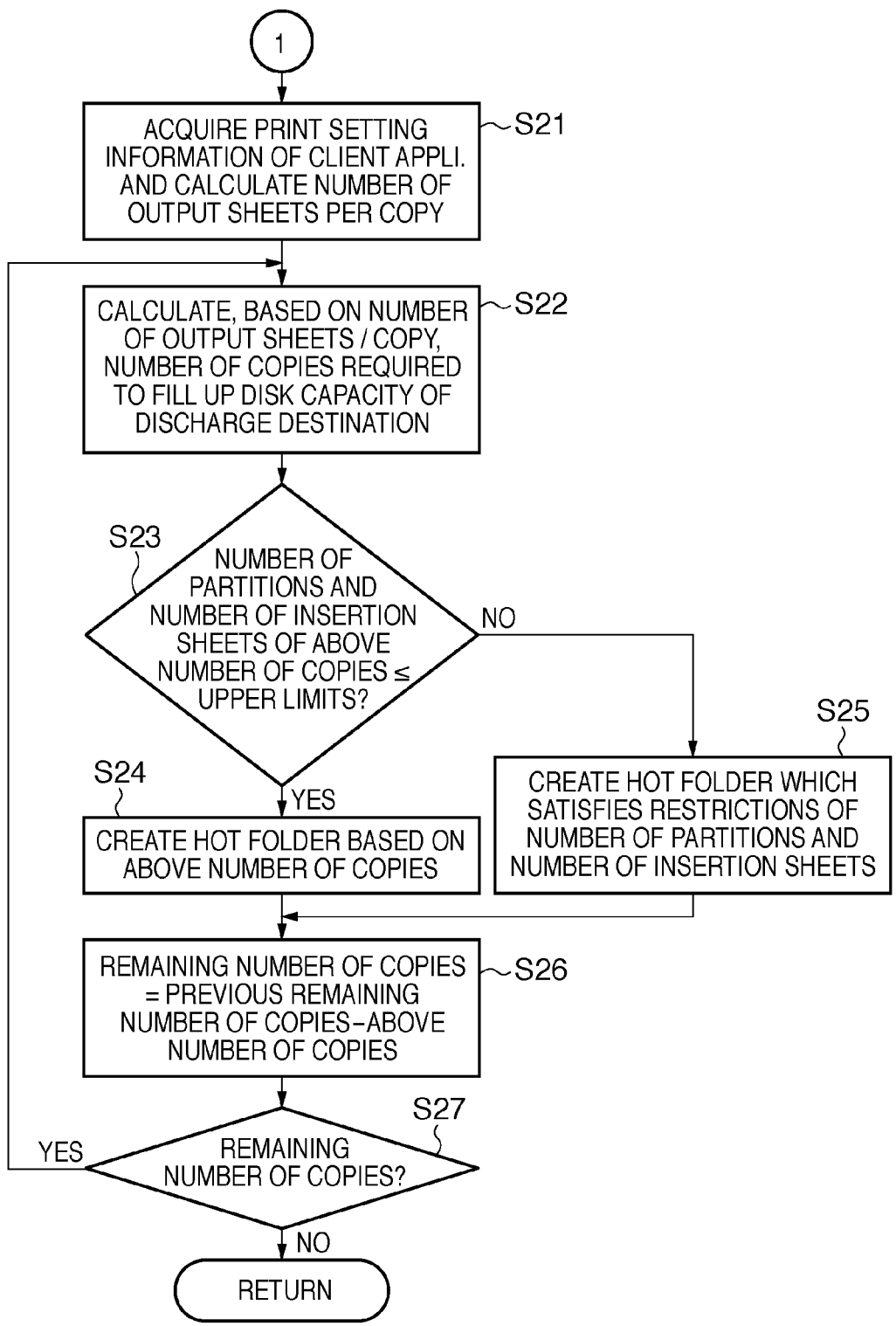
FIG. 27 is a flowchart for explaining an example of the processing procedures that implement the processing shown in FIG. 26.
Figure 28:
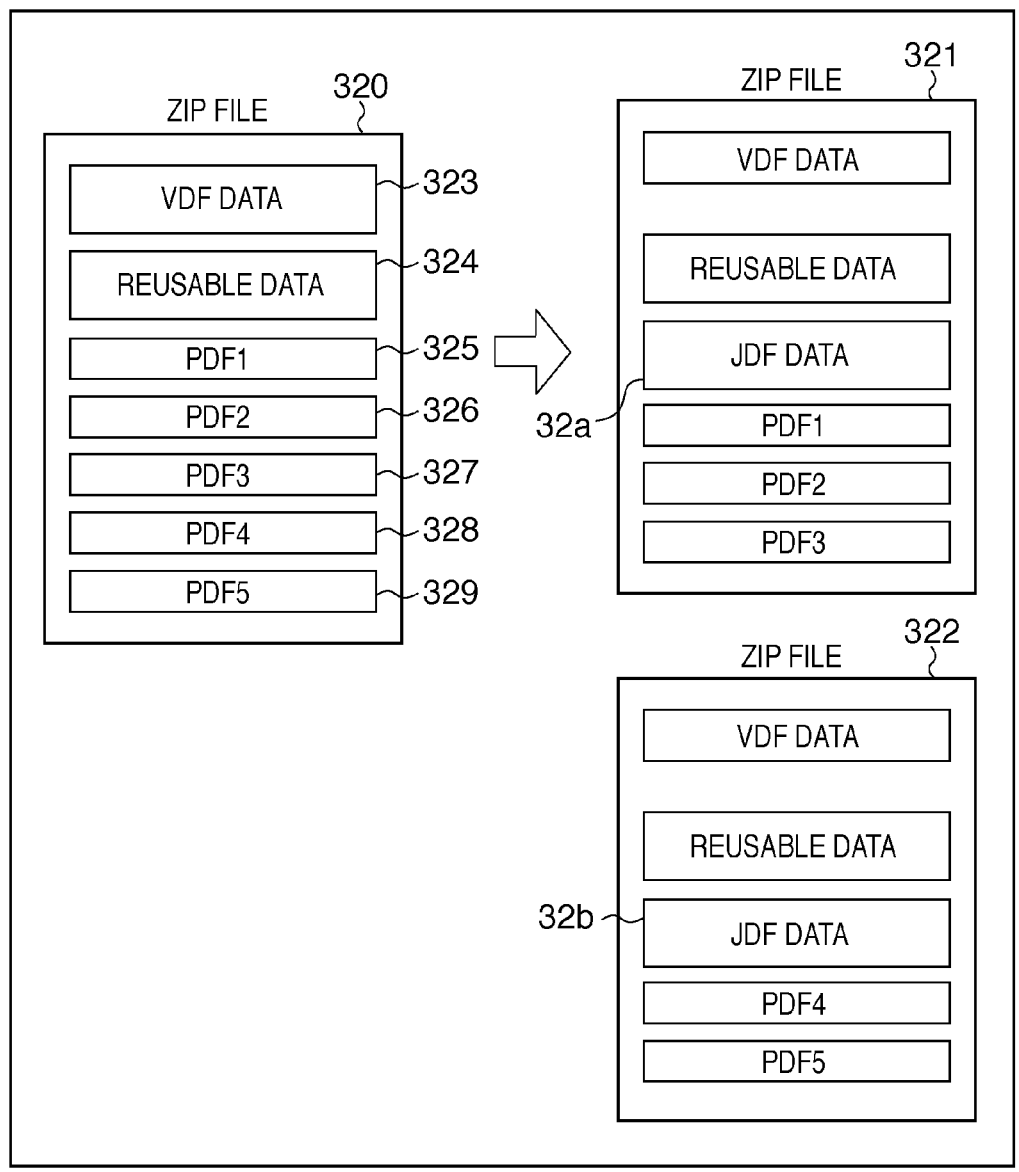
FIG. 28 is a view for explaining division of a print job according to the third embodiment.

FIGS. 26 to 28 will explain the second transmission example of print jobs of the third embodiment. The second transmission example will exemplify a case in which upon execution of actual print operations, when continuous print processing is disturbed by the DISK capacity restriction of an MFP, a print job to be transmitted from an HF is automatically divided and created. Note that the same reference numerals in FIG. 26 denote the same elements as in FIGS. 4, 17, and 24.

The color MFP 37 has a device restriction of 1000 partitions, allows a setting of insertion sheets up to 1000 positions, and a DISK capacity restriction of 1000 GB. Reference numeral 313 denotes a print job whose print processing is in progress in the print queue of the color MFP 37, and which is created to have the print setting 220 of the HF client appli. 46.

At this time, when a print job 310 created by the HF client appli. 47 is to be set in the print queue, the total number of partitions becomes 1100, which exceed the restriction (1000 partitions) of the number of partitions of the color MFP 37. Also, assume that the DISK capacity restriction (1000 GB) of the color MFP 37 is also exceeded. For this reason, the print job 310 cannot be transmitted to the color MFP 37 before the print job 313 is completed. Therefore, a print job transmitted from the HF client appli. 47 is divided into two print jobs 311 and 312, each of which satisfies the restriction of the number of partitions, and the DISK capacity restriction, and these two print jobs 311 and 312 are transmitted. FIG. 26 shows this example, and the divided print job 311 corresponds to a print job 314 set in the print queue of the color MFP 37. The other divided print job 312 is transmitted after completion of the print job 313 whose print processing is in progress. Such processing is included in the print job changing processing.

(Procedure Example of Second Transmission Example of Third Embodiment)

FIG. 27 is a flowchart showing a procedure example in which a print job is divided in consideration of restrictions due to the upper limit values of the DISK capacity and processing program. For example, the upper limit values are set not to pose any problem in another processing by occupying a memory and the like. This flowchart is also shown as the sequel of FIG. 23 as in FIG. 25, but it may be an independent flowchart.

In step S21, the CPU 101 acquires the print setting information 310 of the HF client appli. 47, and calculates the number of output sheets required to be printed per copy. The process advances to step S22, and the CPU 101 calculates the number of copies to be printed required to fill up the DISK capacity of a discharge destination based on the number of sheets to be printed out per copy acquired in step S21. The process advances to step S23, and the CPU 101 checks if the number of partitions and the number of insertion sheets of a print job which is to be created in correspondence with the number of copies acquired in step S22 are equal to or smaller than the upper limits of those of the discharge destination.

If the number of partitions and the number of insertion sheets of the print job to be created are equal to or smaller than the upper limits of those of the discharge destination, the process advances to step S24, and the CPU 101 sets the number of copies to be output acquired in step S22 as a first division unit of a print job by the HF client appli. 47. If it is determined in step S23 that the number of partitions and the number of insertion sheets of the print job to be created exceed the upper limits of those of the discharge destination, the process advances to step S25, and the CPU 101 calculates a MAX value of the number of copies with which the number of partitions and the number of insertion sheets do not exceed the upper limits of those of the discharge destination. Then, the CPU 101 sets that MAX value as a first division unit of a print job of the HF client appli. 47.

Then, the CPU 101 creates one HF based on the number of copies to be output acquired by the processes so far. In step S26, the CPU 101 calculates the remaining number of copies of the total number of copies to be created by the HF client appli. 47. The CPU 101 checks in step S27 if a printable HF is created. If the remaining number of copies still remains, the process returns to step S22 to divide them; otherwise, the processing ends. The print jobs 311 (314) and 312 shown in FIG. 26 correspond to the division results of this example.

FIG. 28 shows an example of a ZIP file when the print job division processing shown in FIG. 26 is executed using variable data.

Reference numeral 320 denotes a variable data file entered to the HF client appli. 47; and 321 and 322, divisionally created print jobs. The variable data file 320 includes a variable print processing instruction 323, reusable data 324 which is repetitively used in print processing, and variable data 325, 326, 327, 328, and 329 such as a user name. Reference numeral 32a denotes print instruction data which records the print setting 311; and 32b, print instruction data which records the print setting 312.

Other Embodiments

Note that the present invention may be applied to either of a system or integrated apparatus including a plurality of devices (for example, a host computer, interface device, and printer), or an apparatus including a single device.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-265713 filed on Oct. 14, 2008 which is hereby incorporated by reference herein in its entirety.

The invention claimed is:

1. A file control apparatus comprising:
   a reception unit configured to receive an entry of a file;
   a print setting information creating unit configured to create print setting information;
   a print job creating unit configured to create a print job by appending the print setting information created by said print setting information creating unit to the file received by said reception unit;
   a transmission unit configured to transmit the print job created by said print job creating unit to a print device;
   an acquiring unit configured to acquire process restriction information from the print device when the print device is continuously received a plurality of print jobs, the process restriction information indicating an upper limit of a sum of partitions or a sum of insertion sheets set by the plurality of print jobs managed concurrently in the print queue of the print device;
   a determination unit configured to determine whether or not the restriction by the process restriction information acquired by said acquiring unit is exceeded when the print device continuously receives a plurality of print jobs corresponding to a plurality of files received by said reception unit; and
   a print job changing unit configured to change, when said determination unit determines that the restriction by the process restriction information is exceeded when the plurality of print jobs are continuously received, a setting about the partitions or the insertion sheets of a succeeding print job so as not to exceed the restriction by the process restriction information even when the succeeding print job is transmitted,
   wherein the print setting information includes information indicating an order to entries of files to said reception unit, and
   wherein the file control apparatus further comprises a print job management unit configured to arrange a sequence of print jobs, which are created by said print job creating unit and are to be transmitted from said transmission unit, based on information which is included in the print setting information and indicates the order of entries of files.

2. The apparatus according to claim 1, wherein said print setting information creating unit creates the print setting information which further includes a folder name possessed by said reception unit, and
   said print job management unit arranges the sequence of print jobs, which are created by said print job creating unit and are to be transmitted from said transmission unit, based on the information indicating the order of entries of files having an identical folder name.

3. The apparatus according to claim 1, wherein said print job changing unit comprises a print destination changing unit configured to change a print destination of the succeeding print job to another print device so that the restriction by the process restriction information is not exceeded.

4. The apparatus according to claim 1, wherein said print job changing unit comprises a print job dividing unit configured to divide the succeeding print job so as not to exceed the restriction by the process restriction information even when the succeeding print job is transmitted.

5. The apparatus according to claim 4, wherein said print job dividing unit divides the succeeding print job into a plurality of print jobs having identical print setting information.

6. A print system comprising a print section including a plurality of print devices, and a file control apparatus according to claim 1, which is connected to said print section via a network and controls print processing of the plurality of print devices.

7. A print system comprising a print section including a plurality of print devices, a file control apparatus according to claim 1, which is connected to said print section via a first network and controls print processing of the plurality of print devices, and an operator environment configured to perform an entry of a file to said reception unit of said file control apparatus, said operator environment being connected to said file control apparatus via a second network.

8. A method of controlling a file control apparatus, comprising the step of:
   receiving an entry of a file;
   creating print setting information;
   creating a print job by appending the print setting information created in the step of creating the print setting information to the file received in the receiving step;
   transmitting the print job created in the step of creating the print job to a print device;
   acquiring process restriction information from the print device when the print device is continuously received a plurality of print jobs, the process restriction information indicating an upper limit of a sum of partitions or a sum of insertion sheets set by the plurality of print jobs managed concurrently in the print queue of the print device;
   determining whether or not the restriction by the process restriction information acquired in the acquiring step is exceeded when the print device continuously receives a plurality of print jobs corresponding to a plurality of files received in the receiving step; and
   changing, when it is determined in the determining step that the restriction by the process restriction information is exceeded when the plurality of print jobs are continuously received, a setting about the partitions or the insertion sheets of a succeeding print job so as not to exceed the restriction by the process restriction information even when the succeeding print job is transmitted,
   wherein the print setting information includes information indicating an order to entries of files in the receiving step, and
   wherein the method further comprises arranging a sequence of print jobs, which are created in the creating and are to be transmitted in the transmitting step, based on information which is included in the print setting information and indicates the order of entries of files.

9. The method according to claim 8, wherein the step of changing the succeeding print job comprises the step of changing a print destination of the succeeding print job to another print device so that the restriction by the process restriction information is not exceeded.

10. The method according to claim 8, wherein the step of changing the succeeding print job comprises the step of dividing the succeeding print job so as not to exceed the restriction by the process restriction information even when the succeeding print job is transmitted.

11. The method according to claim 10, wherein in the step of dividing the succeeding print job, the succeeding print job is divided into a plurality of print jobs having identical print setting information.

12. A non-transitory computer-readable storage medium storing a program for causing a computer to execute respective steps of a method of controlling a file control apparatus according to claim 8.

* * * * *